(12) United States Patent
Igarashi et al.

(10) Patent No.: US 12,418,732 B2
(45) Date of Patent: Sep. 16, 2025

(54) DEVICE, SYSTEM, MOBILE OBJECT, AND APPARATUS

(71) Applicant: CANON KABUSHIKI KAISHA, Tokyo (JP)

(72) Inventors: Shinya Igarashi, Kanagawa (JP); Taichi Kasugai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 555 days.

(21) Appl. No.: 18/047,191

(22) Filed: Oct. 17, 2022

(65) Prior Publication Data

US 2023/0122042 A1 Apr. 20, 2023

(30) Foreign Application Priority Data

Oct. 20, 2021 (JP) .................. 2021-171693

(51) Int. Cl.
| | | |
|---|---|---|
| H04N 5/353 | (2011.01) | |
| H04N 5/341 | (2011.01) | |
| H04N 5/376 | (2011.01) | |
| H04N 7/18 | (2006.01) | |
| H04N 25/40 | (2023.01) | |
| H04N 25/533 | (2023.01) | |
| H04N 25/76 | (2023.01) | |

(52) U.S. Cl.
CPC ........... *H04N 25/533* (2023.01); *H04N 7/183* (2013.01); *H04N 25/40* (2023.01); *H04N 25/7795* (2023.01)

(58) Field of Classification Search
CPC ........ H04N 25/40; H04N 25/50; H04N 25/53; H04N 25/533; H04N 25/70; H04N 25/74; H04N 25/745; H04N 25/75; H04N 25/76; H04N 25/66; H04N 25/766; H04N 25/767; H04N 25/768; H04N 25/779; H04N 25/7795; H04N 7/183
See application file for complete search history.

(56) References Cited

U.S. PATENT DOCUMENTS

| | | | | |
|---|---|---|---|---|
| 7,723,694 | B2 * | 5/2010 | Frach ................... | H04N 25/773 250/370.11 |
| 10,852,399 | B2 * | 12/2020 | Fenigstein ............ | H10F 77/959 |
| 10,971,539 | B2 * | 4/2021 | Maehashi ............. | H10F 30/225 |
| 11,172,147 | B2 * | 11/2021 | Kuroda ................ | H04N 25/773 |
| 11,402,264 | B2 * | 8/2022 | Ota ....................... | H04N 25/709 |

(Continued)

FOREIGN PATENT DOCUMENTS

| | | | |
|---|---|---|---|
| JP | H0767043 A | 3/1995 | |
| JP | 2002027303 A | 1/2002 | |

(Continued)

*Primary Examiner* — John R Lee
(74) *Attorney, Agent, or Firm* — Canon U.S.A., Inc. IP Division

(57) ABSTRACT

A device includes a pixel unit, a selection unit, and a first generation unit. The pixel unit has a plurality of pixels arranged in a plurality of rows. Each pixel includes a quenching circuit configured to receive a signal for determining start and end of an exposure period and a photodiode coupled to the quenching circuit. The selection unit is configured to simultaneously receive a plurality of clock signals of different periods and select a clock signal to be outputted from the plurality of clock signals. The first generation unit is configured to generate the signal by using the outputted clock.

19 Claims, 17 Drawing Sheets

(56) References Cited

U.S. PATENT DOCUMENTS

| | | | |
|---|---|---|---|
| 11,936,987 B2* | 3/2024 | Ogushi | H04N 23/71 |
| 11,953,629 B2* | 4/2024 | Yin | G01J 1/44 |
| 11,977,186 B2* | 5/2024 | Buckbee | G01S 7/4863 |
| 12,044,568 B2* | 7/2024 | Ota | H04N 25/773 |
| 12,210,101 B2* | 1/2025 | Maekawa | G01S 7/4865 |
| 12,230,722 B2* | 2/2025 | Shinohara | H10F 39/18 |
| 12,238,432 B2* | 2/2025 | Kasugai | H04N 25/75 |
| 2019/0305030 A1* | 10/2019 | Maehashi | H04N 25/57 |
| 2020/0084396 A1* | 3/2020 | Kuroda | H10F 77/959 |
| 2020/0158566 A1* | 5/2020 | Ota | H04N 25/773 |
| 2020/0244909 A1* | 7/2020 | Morimoto | H10F 39/813 |
| 2020/0252534 A1* | 8/2020 | Yasuda | H04N 25/533 |
| 2021/0020793 A1* | 1/2021 | Shinohara | H10F 77/959 |
| 2021/0302551 A1* | 9/2021 | Kubota | G01S 7/4863 |
| 2022/0236420 A1* | 7/2022 | Maekawa | G01S 17/894 |
| 2023/0119511 A1* | 4/2023 | Kasugai | H04N 25/773 348/302 |
| 2023/0122042 A1* | 4/2023 | Igarashi | H04N 7/183 348/148 |
| 2023/0228875 A1* | 7/2023 | Nakagawa | H10F 30/20 356/5.01 |
| 2023/0343879 A1* | 10/2023 | Ota | H10F 30/225 |
| 2024/0337532 A1* | 10/2024 | Ota | H04N 25/773 |
| 2024/0353258 A1* | 10/2024 | Ota | G01J 1/44 |
| 2025/0039580 A1* | 1/2025 | Kobayashi | H04N 25/773 |
| 2025/0160052 A1* | 5/2025 | Shinohara | H10F 30/225 |

FOREIGN PATENT DOCUMENTS

| | | |
|---|---|---|
| JP | 2012175234 A | 9/2012 |
| JP | 2020123847 A | 8/2020 |
| WO | 2010137244 A1 | 12/2010 |
| WO | 2019225071 A1 | 11/2019 |

* cited by examiner

TO FIG. 6B

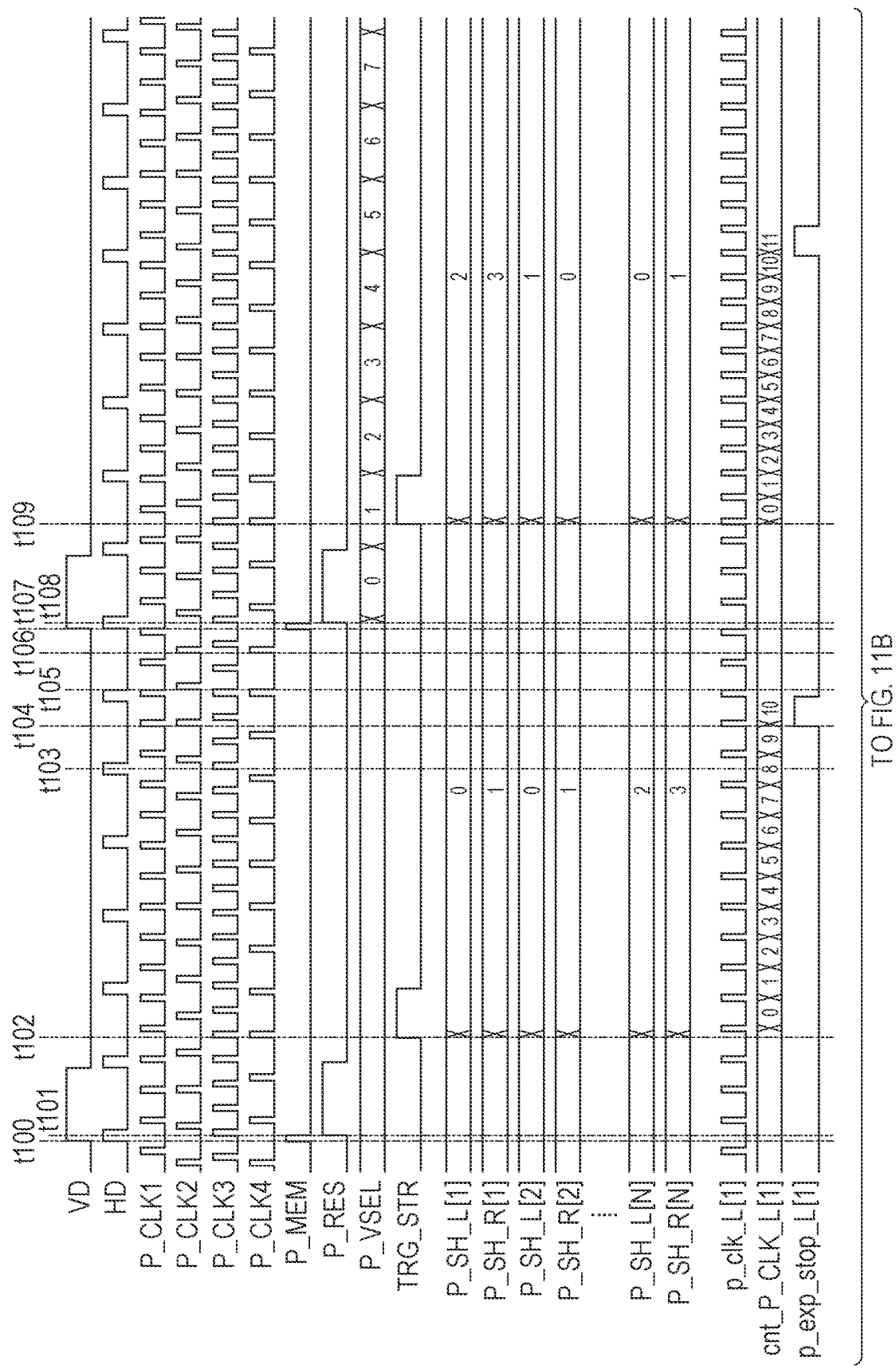

DEVICE, SYSTEM, MOBILE OBJECT, AND APPARATUS

BACKGROUND

Technical Field

The aspect of the embodiments relates to a device, a system, a mobile object, and an apparatus.

Description of the Related Art

There is a known photoelectric conversion device having a pixel array formed by arranging a plurality of pixels individually including avalanche photodiodes (APDs). In an APD, electric charge caused by incident light effects avalanche multiplication at the P-N junction region of the APD.

Japanese Patent Laid-Open No. 2020-123847 discloses a device including an APD, a quenching circuit coupled to the APD, a quenching circuit having the gate for receiving a pulse signal, and a pulse generator circuit for generating the pulse signal. The pulse generator circuit controls the quenching circuits to turn on or off. The exposure period of the APD is controlled based on the pulse signal.

SUMMARY

A device according to an aspect of the embodiments includes a pixel unit, a selection unit, and a first generation unit. The pixel unit has a plurality of pixels arranged in a plurality of rows. Each pixel includes a quenching circuit configured to receive a signal for determining start and end of an exposure period and a photodiode coupled to the quenching circuit. The selection unit is configured to simultaneously receive a plurality of clock signals of different periods and select a clock signal to be outputted from the plurality of clock signals. The first generation unit is configured to generate the signal by using the outputted clock signal.

Further features of the disclosure will become apparent from the following description of exemplary embodiments with reference to the attached drawings.

BRIEF DESCRIPTION OF THE DRAWINGS

FIGS. 11A, 11B, and 11C provide a timing diagram illustrating pixel drive operation.

DESCRIPTION OF THE EMBODIMENTS

Hereinafter, embodiments will be described with reference to the drawings.

The following description of the embodiments is mainly about an imaging device as an example of a photoelectric conversion device. However, the embodiments are not limited to an imaging device, and the embodiments can be applied to other examples of the photoelectric conversion device. The other examples include, for example, a rangefinder (a device for, for example, focus detection or distance measurement according to the time-of-flight (TOF) principle and a photometer (a device for, for example, measurement of incident light intensity).

The conductivity type of the transistor described in the following embodiments is merely an example, and this is not to be interpreted as limiting. The conductivity type described in the embodiments is changeable as appropriate; the electric potential at the gate, source, and drain of the transistor is also changed as appropriate to this change.

For example, when the transistor operates as a switch, with change of the conductivity type, the low and high levels of electric potential supplied to the gate are reversed as compared to the description of the embodiments. Additionally, the conductivity type of the semiconductor region described in the following embodiments is also merely an example, and this is not to be interpreted as limiting. The conductivity type described in the embodiments is changeable as appropriate; the electric potential at the semiconductor region is also changed as appropriate to this change. For example, in the following description of the embodiments, a quenching element 12 coupled to an avalanche diode is formed by a P-type metal-oxide-semiconductor (PMOS) transistor, but the quenching element 12 may be changed to an N-type metal-oxide-semiconductor (NMOS) transistor. In this case, the high and low levels of a signal supplied to the gate can be changed.

First Embodiment

Overall Description of Photoelectric Conversion Device 100

Figure 1:
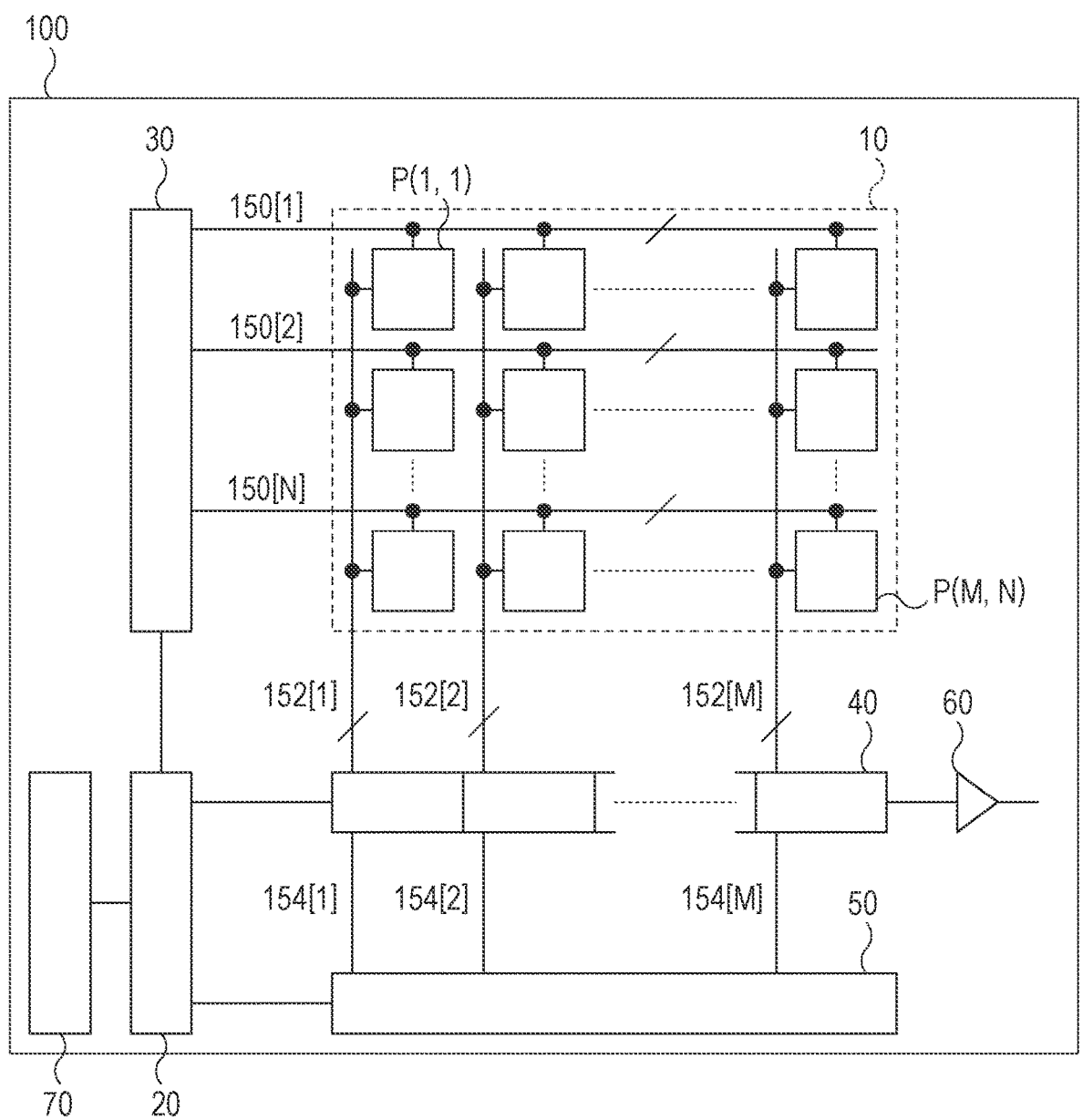
FIG. 1 illustrates a configuration of a photoelectric conversion device.

FIG. 1 is a block diagram illustrating the outline of a configuration of a photoelectric conversion device according to the present embodiment. A photoelectric conversion device 100 according to the present embodiment includes, as illustrated in FIG. 1, a pixel unit 10, a control unit 20, a vertical scanner unit 30 (scanner unit), signal processing units 40, a horizontal scanner unit 50 (second scanner unit), and an output unit 60.

In the pixel unit 10, a plurality of pixels P are arranged in a plurality of rows and a plurality of columns. FIG. 1 illustrates the pixels P arranged in a number N of rows consisting of a first row to an Nth row and a number M of columns consisting of a first column to an Mth column, with reference characters indicating a row number and a column number. For example, the pixel P disposed in the first row and the first column is assigned reference characters P(1, 1).

The pixel unit 10 does not necessarily include the pixels P in a plurality of columns. For example, the pixels P may be arranged in one column and a plurality of rows.

Control line sets 150 are extended in a first direction (the lateral direction in FIG. 1) along the respective rows of the pixel array of the pixel unit 10. Each control line set 150 is coupled to the individual pixels P aligned in the first direction; the control line set 150 is coupled in a shared manner to the pixels P of the plurality of columns arranged in each row. Each control line set 150 includes a plurality of control lines for controlling the pixels P in one row. The plurality of control lines are used to transmit a signal pCLK, a signal pRES, and a signal pVSEL, which will be described later, from the vertical scanner unit 30 to the pixels P in the corresponding row. The vertical scanner unit 30 sequentially selects the pixels P in the rows of the pixel unit 10 in units of one row, or two or more rows. In this manner, the vertical scanner unit 30 performs row scanning (vertical scanning) on the pixel unit 10. As used herein, the term "unit" refers to one pixel row, or two or more pixel rows as a group that is selected by the vertical scanner unit 30 at a given time.

The first direction in which the control line sets 150 are extended is also referred to as the row direction or the horizontal direction. In FIG. 1, the control line sets 150 are illustrated with reference characters indicating row numbers. For example, the control line set along the first row is assigned 150[1].

The control line sets 150 of the respective rows are coupled to the vertical scanner unit 30. The vertical scanner unit 30 feeds a control signal for controlling the pixels P to the pixels P through the control lines.

Output lines 152 are extended in a second direction (the longitudinal direction in FIG. 1) crossing the first direction, along the respective columns of the pixel array of the pixel unit 10. Each output line 152 is coupled to the individual pixels P aligned in the second direction, forming a signal line shared by these pixels P.

The second direction in which the output lines 152 are extended is also referred to as the column direction or the vertical direction.

In FIG. 1, the output lines 152 are illustrated with reference characters indicating column numbers. For example, the output line along the first column is assigned 152[1]. A pixel signal of digital signal is outputted to each output line 152 from the corresponding pixel P in a particular row selected by the vertical scanner unit 30.

The pixel signal is typically digital signals corresponding to a plurality of bits. The output line 152 may be formed by a bus including a plurality of signal lines each corresponding to a signal of one bit of the digital signals corresponding to a plurality of bits. This configuration enables parallel transmission of digital signals of the respective bits. Alternatively, a plurality of buses of this kind of bus may be provided for the pixels P in one column. Some of the plurality of buses are coupled to the pixels P in some of the plurality of rows, while the others of the plurality of buses are coupled to the pixels P in the others of the plurality of rows. With this configuration, digital signals from the pixels P in the plurality of rows can be simultaneously read. The present disclosure is not limited to these configurations. A single output line 152 may corresponds to the pixels P in one column, and digital signals corresponding to a plurality of bits may be serially transmitted.

The output lines 152 are coupled to the signal processing units 40. The signal processing units 40 respectively correspond to the columns of the pixel unit 10, coupled to the output lines 152 in the corresponding columns.

The signal processing unit 40 has a retention unit for retaining the pixel signal outputted by the pixels P in the corresponding column through the output line 152.

The horizontal scanner unit 50 is a circuit unit for feeding to the signal processing units 40 a control signal for reading a signal from the signal processing units 40. The horizontal scanner unit 50 feeds the control signal to the signal processing units 40 of the individual columns through control lines 154. When the signal processing unit 40 receives the control signal from the horizontal scanner unit 50, the signal processing unit 40 outputs a signal retained in the retention unit to the output unit 60. The horizontal scanner unit 50 selects the signal processing units 40 of the plurality of columns in units of one column, or two or more columns to perform column scanning (horizontal scanning). The control unit 20 inputs a horizontal synchronization signal HD to the horizontal scanner unit 50. When the level of the horizontal synchronization signal HD is changed, the horizontal scanner unit 50 starts horizontal scanning (second scanning) of the signal processing units 40 of the individual columns. In a typical case, when the horizontal synchronization signal HD is changed from the low level to the high level, the horizontal scanner unit 50 starts horizontal scanning of the signal processing units 40 of the individual columns. The horizontal synchronization signal HD is a signal for controlling a period to perform horizontal scanning.

In FIG. 1, the control lines 154 are illustrated with reference characters indicating column numbers. For example, the control line along the first column is assigned 154[1].

The output unit 60 is a circuit unit for outputting a signal outputted from the signal processing units 40 outside the photoelectric conversion device 100. The output unit 60 may perform various kinds of processing such as noise reduction processing and correction processing before outputting the signal outside the photoelectric conversion device 100.

The control unit 20 is a circuit unit for supplying control signals for controlling operations and their timings of the vertical scanner unit 30, the signal processing unit 40, the horizontal scanner unit 50, and the output unit 60.

A central processing unit (CPU) 70 is a circuit unit for controlling the photoelectric conversion device with the control unit 20 by running a program.

Control signals for controlling operations and their timings of the control unit 20, the vertical scanner unit 30, the signal processing units 40, the horizontal scanner unit 50, the output unit 60, and the CPU 70 may be at least partially supplied from the outside of the photoelectric conversion device 100.

Pixel P(m, n)

Figure 2:
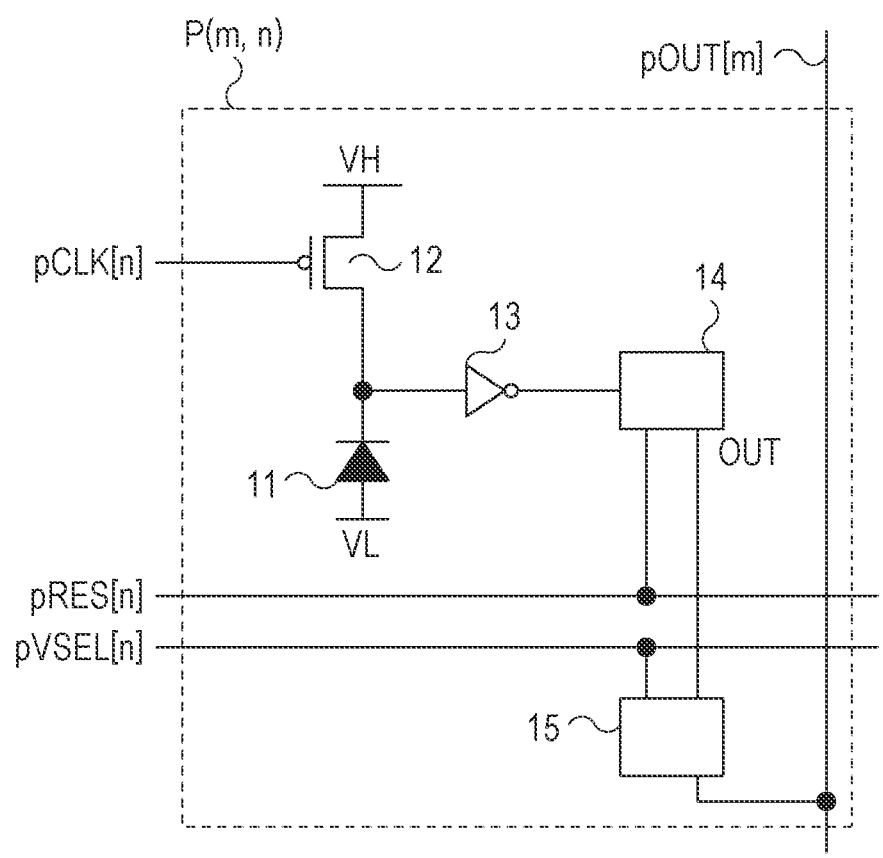
FIG. 2 illustrates a configuration of a pixel.

FIG. 2 illustrates a configuration of a pixel P(m, n) of the photoelectric conversion device of this embodiment.

The pixel P(m, n) includes an avalanche photodiode (APD) 11, a quenching circuit 19, a waveform shaping unit 13, a counter 14, and a pixel output circuit 15. In the example in FIG. 2, the quenching circuit 19 is implemented by the quenching element 12.

The APD 11 generates an electric charge pair in response to incident light (in response to a striking photon) by photoelectric conversion. A voltage VL (a first voltage) is supplied to the anode of the APD 11. A voltage VH (a second voltage), which is higher than the voltage VL supplied to the anode, is supplied to the cathode of the APD 11. To the anode and cathode, reverse bias voltages are applied so that the APD 11 provides avalanche multiplication. In the state in which such voltages are being applied, electric charge generated in response to incident light is avalanche multiplied, so that avalanche current is generated.

When reverse bias voltages are applied, the following modes of operation are provided: in Geiger mode, the potential difference between the anode and cathode is larger than breakdown voltage; in linear mode, the potential difference between the anode and cathode is close to breakdown voltage or equal to or smaller than breakdown voltage.

The APD operating in Geiger mode is referred to as a single-photon avalanche diode (SPAD). For example, the voltage VL (the first voltage) is −30 V, and the voltage VH (the second voltage) is 3 V. The APD 11 may be caused to operate in linear mode or Geiger mode.

The quenching element 12 is coupled to a power line for supplying the voltage VH and the APD 11. The quenching element 12 functions as a load circuit (a quenching circuit) when signals are multiplied by avalanche multiplication.

The quenching element 12 can be implemented by a transistor. For example, the quenching element 12 can be implemented by a metal-oxide-semiconductor (MOS) transistor. FIG. 2 illustrates the case in which the quenching element 12 is a PMOS transistor.

The signal pCLK is inputted to the gate of the quenching element 12. The gate is a control node. When the signal pCLK is inactive, the quenching element 12 is in a disconnected state (off-state). By contrast, when the signal pCLK is active, the quenching element 12 is in a connected state (on-state). When the quenching element 12 is in a disconnected state, the quenching element 12 reduces voltage supplied to the APD 11 to suppress avalanche multiplication (quenching). When the quenching element 12 is in a connected state, the quenching element 12 passes a current corresponding to the voltage drop due to quenching, so that voltage supplied to the APD 11 returns to the voltage VH (recharging). When the quenching element 12 is in an off-state, the electrical path between the power line for supplying the voltage VH and the APD 11 is not necessarily completely disconnected (cut off), but it is only needed to control resistance to achieve a level that enables the quenching operation. This means that when the quenching element 12 is in an off-state, the resistance of the electrical path between the power line and the APD 11 can be made higher than when the quenching element 12 is in an on-state.

The signal pCLK[n] is fed to the gate of the quenching element 12 through a control line (not illustrated in FIG. 1) to control connection and disconnection of the quenching element 12. The signal pCLK is a pulse signal that is inputted to the gate of the quenching element 12 as a control signal for determining start and end of an exposure period of the pixel P.

The waveform shaping unit 13 changes the shape of a change in potential at the cathode of the APD 11 when a photon is detected and outputs a pulse signal. For example, an inverter circuit is used as the waveform shaping unit 13. FIG. 2 illustrates the example in which a single inverter is used as the waveform shaping unit 13, but a circuit including a plurality of inverters coupled in series may be used as the waveform shaping unit 13. Alternatively, other kinds of circuits capable of providing waveform shaping may be used as the waveform shaping unit 13.

The counter 14 counts the number of pulse signals outputted by the waveform shaping unit 13 and holds the count value. The vertical scanner unit 30 feeds the signal pRES[n] through a control line (not illustrated in FIG. 1). When the signal pRES[n] is active, the count value stored in the counter 14 is reset to an initial value. This initial value is typically 0 on all bits, but other initial values may be used for the resetting.

The vertical scanner unit 30 feeds the signal pVSEL[n] to the pixel output circuit 15 through a control line. The signal pVSEL[n] controls electrical connection and disconnection between the counter 14 and a signal line pOUT[m]. The pixel output circuit 15 includes, for example, a buffer circuit for outputting a signal.

A switch such as a transistor may be provided between the APD 11 and the quenching element 12 to control electrical connection and disconnection. Similarly, a switch such as a transistor for controlling activation and inactivation of supply of the voltage VH to the quenching element 12 may be added to the configuration in FIG. 2. This switch may be provided for each pixel or each pixel row. Alternatively, a single switch may be shared by all pixels. Likewise, a switch such as a transistor for controlling activation and inactivation of supply of the voltage VL to the APD 11 may be added to the configuration in FIG. 2. This switch may be provided for each pixel or each pixel row. Alternatively, a single switch may be shared by all pixels.

The present embodiment presents a configuration using the counter 14. Instead of the counter 14, a time-to-digital converter (hereinafter referred to as a TDC) and a memory may be used to enable the photoelectric conversion device 100 to obtain a timing of pulse detection. In this case, the TDC converts the timing of occurrence of a pulse signal outputted by the waveform shaping unit 13 into a digital signal. To detect the timing of occurrence of a pulse signal, the vertical scanner unit 30 in FIG. 1 feeds a signal pREF[n] to the TDC through a control line (not illustrated in FIG. 1). The TDC obtains, as a digital signal, a signal indicating a relative time of the timing of inputting a signal outputted from the corresponding pixel via the waveform shaping unit 13, based on the signal pREF[n].

Control Unit 20

Figure 3:
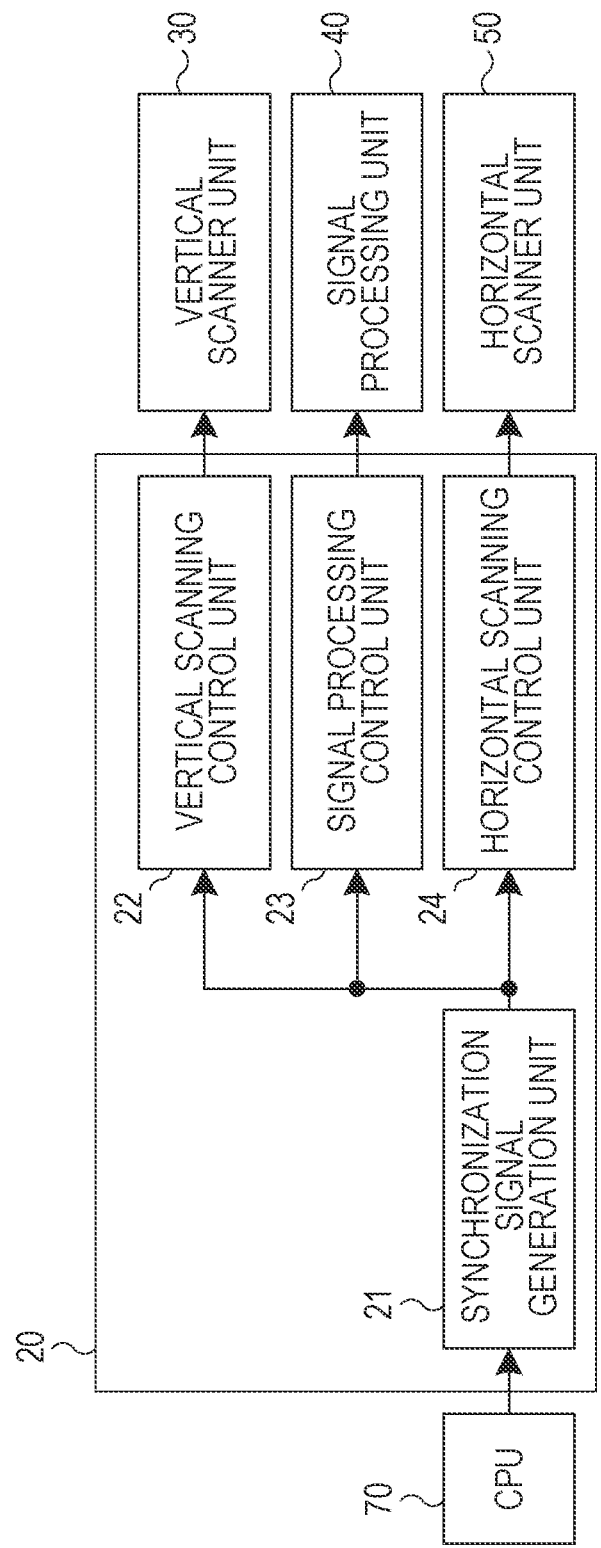
FIG. 3 illustrates a configuration of a control unit.

FIG. 3 illustrates a configuration of the control unit 20. A control signal is inputted to the control unit 20 from the CPU 70 provided outside the control unit 20. The control unit 20 includes a synchronization signal generation unit 21, a vertical scanning control unit 22, a signal processing control unit 23, and a horizontal scanning control unit 24.

The synchronization signal generation unit 21 generates a vertical synchronization signal VD, the horizontal synchronization signal HD, and a clock MCLK (reference clock signal) under the control of the CPU 70. The vertical synchronization signal VD is a signal for controlling the period of one frame. Typically, start of vertical scanning with the vertical scanner unit 30 is controlled based on the vertical synchronization signal VD. The horizontal synchronization signal HD is a signal for changing the selected pixel row for vertical scanning and horizontal scanning. The horizontal synchronization signal HD is a signal for controlling read operation of reading signals from the pixels P in individual rows. The vertical synchronization signal VD is also a signal for controlling read operation of reading signals from the entire pixel unit.

The vertical scanning control unit 22 generates a signal for controlling the timing of driving the vertical scanner unit 30 and outputs the signal to the vertical scanner unit 30.

The signal processing control unit 23 generates a signal for controlling the timing of driving the signal processing unit 40 and outputs the signal to the signal processing unit 40.

The horizontal scanning control unit 24 generates a signal for controlling the timing of driving the horizontal scanner unit 50 and outputs the signal to the horizontal scanner unit 50.

Vertical Scanning Control Unit 22

Figure 4:
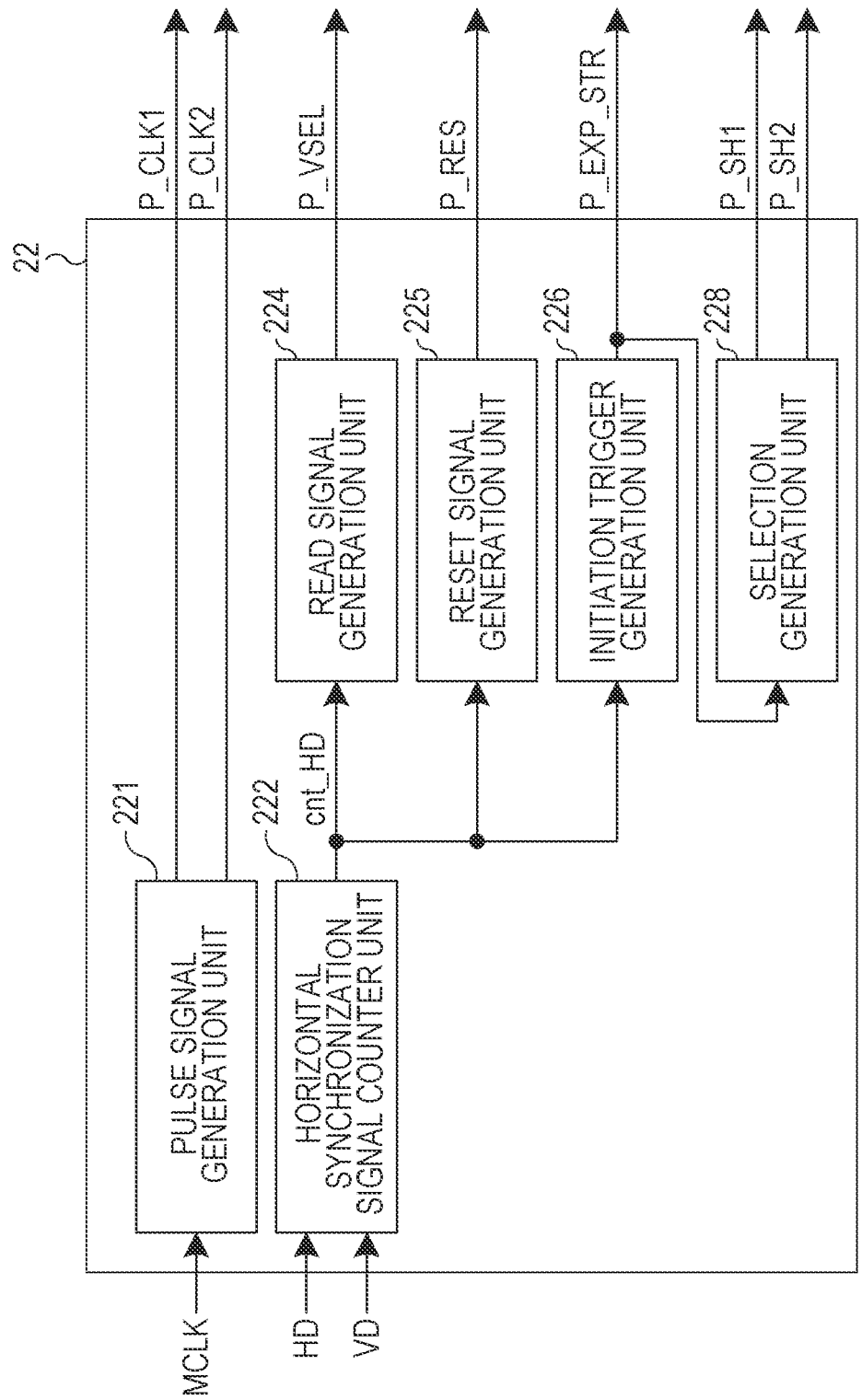
FIG. 4 illustrates a configuration of a vertical scanning control unit.

FIG. 4 illustrates a configuration of the vertical scanning control unit 22. The vertical scanning control unit 22 includes a pulse signal generation unit 221, a horizontal synchronization signal counter unit 222, a pulse counter unit 223, a read signal generation unit 224, a reset signal generation unit 225, and an initiation trigger generation unit 226. The vertical scanning control unit 22 further includes a selection generation unit 228.

The pulse signal generation unit 221 includes a frequency divider circuit, which is not illustrated in the drawing, and generates signals P_CLK1 and P_CLK2 by dividing the frequency of the clock MCLK. Because the clock MCLK is used as an original signal, the period of the signals P_CLK1 and P_CLK2 can be controlled in units of one cycle of the clock MCLK. The signals P_CLK1 and P_CLK2 are individually inputted to the vertical scanner unit 30.

The horizontal synchronization signal counter unit 222 receives the vertical synchronization signal VD and the horizontal synchronization signal HD, counts the number of the horizontal synchronization signals HD for one period of the vertical synchronization signal VD, and accordingly outputs a count value cnt_HD.

The pulse counter unit 223 receives the vertical synchronization signal VD and the signal P_CLK, counts the number of the signals P_CLK for one period of the vertical synchronization signal VD, and accordingly outputs a count value cnt_P_CLK.

The read signal generation unit 224 receives the count value cnt_HD and generates a signal P_VSEL corresponding to the count value cnt_HD.

The reset signal generation unit 225 receives the count value cnt_HD and generates a signal P_RES corresponding to the count value cnt_HD.

The initiation trigger generation unit 226 receives the count value cnt_P_CLK and generates a signal P_EXP_STR corresponding to the count value cnt_P_CLK. Here, the signal P_EXP_STR is a control signal for controlling the timing of initiating exposure of the pixel P.

The selection generation unit 228 receives the signal P_EXP_STR and generates signals P_SH1 and P_SH2 representing a shutter number. The number of the signals P_EXP_STR inputted may be two or more, and the number of the signals P_SH outputted may be three or more.

The pulse signal generation unit 221 outputs the signals P_CLK1 and P_CLK2 at different frequencies. The pulse signal generation unit 221 may output as the signal P_CLK three or more clock signals of different periods.

Vertical Scanner Unit 30

Figure 5:
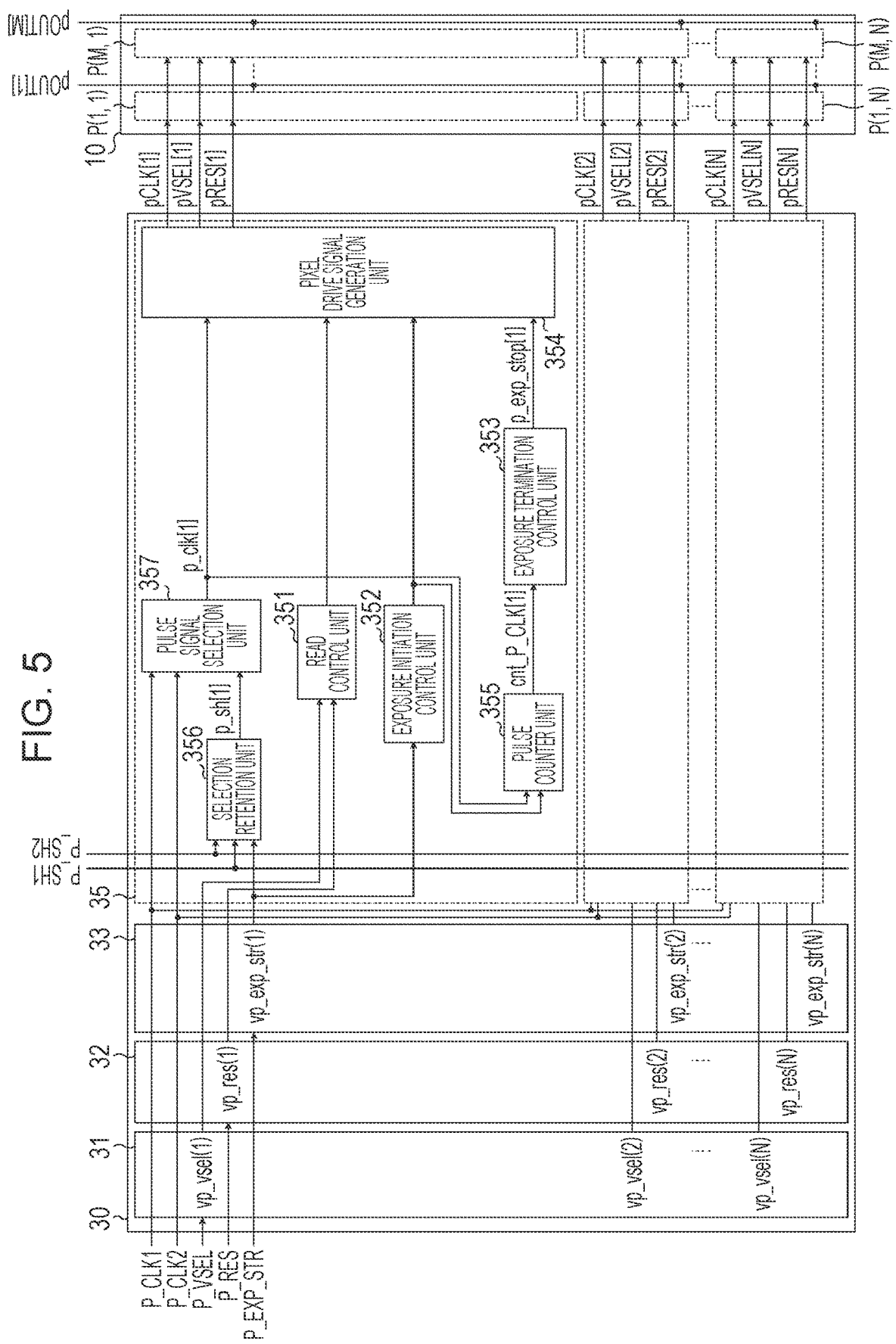
FIG. 5 illustrates a configuration of a vertical scanner unit.

FIG. 5 illustrates a configuration of the vertical scanner unit 30. The vertical scanner unit 30 includes a first decoder unit 31, a second decoder unit 32, a third decoder unit 33, and a number N of row driver units 35 arranged for the individual pixel rows of the pixel unit 10. The configuration is made such that one row driver unit 35 drives one pixel row of the pixel unit 10, but one row driver unit 35 may drive a plurality of rows.

The first decoder unit 31 decodes the signal P_VSEL generated by the vertical scanning control unit 22, generate read row selection signals vp_vsel(1) to (N), and outputs the read row selection signals vp_vsel(1) to (N) to the respective row driver units 35.

Similarly, the second decoder unit 32 decodes the signal P_RES generated by the vertical scanning control unit 22, generates reset row selection signals vp_res(1) to (N), and outputs the reset row selection signals vp_res(1) to (N) to the respective row driver units 35.

Similarly, the third decoder unit 33 decodes the signal P_EXP_STR generated by the vertical scanning control unit 22, generates exposure initiation row selection signals vp_exp_str(1) to (N), and outputs the exposure initiation row selection signals vp_exp_str(1) to (N) to the respective row driver units 35.

The row driver unit 35 includes a read control unit 351, an exposure initiation control unit 352, an exposure termination control unit 353, and a pixel drive signal generation unit 354. The row driver unit 35 further includes a pulse counter unit 355, a selection retention unit 356, and a pulse signal selection unit 357.

The selection retention unit 356 receives the signal P_SH1, the signal P_SH2, and the signal vp_exp_str(1) and generates the signal p_sh[1] representing the shutter number of the target row.

The pulse signal selection unit 357 (a selection unit) receives the signal P_CLK1, the signal P_CLK2, and the signal p_sh[1], selects the signal P_CLK to be used by the target row from the signal P_CLK1 and the signal P_CLK2, and outputs the selected signal P_CLK as the signal p_clk[1]. This means that the pulse signal selection unit 357 is a selection unit for selecting a clock signal to be outputted from a plurality of inputted clock signals of different periods.

The following description mainly focuses on the configuration of the row driver units 35 of the first row, but it is to be understood that the row driver units 35 of other rows has the same configuration.

The read row selection signal vp_vsel(1) outputted by the first decoder unit 31 and the reset row selection signal vp_res(1) outputted by the second decoder unit 32 are inputted to the read control unit 351. The read control unit 351 is controlled with a read control signal and records the level of the read row selection signal vp_vsel(1) and the level of the reset row selection signal vp_res(1). The output signal of the read control unit 351 is a signal for resetting the counters 14 of the pixels P in the corresponding row and establishing connection with the signal line pOUT.

The exposure initiation row selection signal vp_exp_str(1) outputted by the third decoder unit 33 is inputted to the exposure initiation control unit 352. The exposure initiation control unit 352 records the level of the exposure initiation row selection signal vp_exp_str(1). The output signal of the exposure initiation control unit 352 is a signal (an initiation signal) for initiating exposure of the pixels P in the corresponding row.

The read row selection signal vp_vsel(1) and the reset row selection signal vp_res(1) stored in the read control unit 351 are inputted to the pixel drive signal generation unit 354. The exposure initiation row selection signal vp_exp_str(1) stored in the exposure initiation control unit 352 and an exposure termination row selection signal vp_exp_stop(1) stored in the exposure termination control unit 353 are inputted to the pixel drive signal generation unit 354. By using these signals, read operation, reset operation, exposure initiation operation, exposure termination operation are performed on the corresponding pixel row. The timings of performing these operations are controlled with signals inputted to the pixel drive signal generation unit 354. The pixel drive signal generation unit 354 outputs pixel drive signals for these operations to the corresponding pixel row. The pixel drive signals outputted by the pixel drive signal generation unit 354 are the signal pCLK[1], the signal pVSEL[1], and the signal pRES[1]. The configuration is made such that one pixel drive signal generation unit 354 drives one row of the pixel unit 10, but one pixel drive signal generation unit 354 may drive two or more rows.

Behavior of Pixel Drive Signals

An operation of the photoelectric conversion device according to the first embodiment illustrated in FIG. 1 will be described.

Figure 6A:
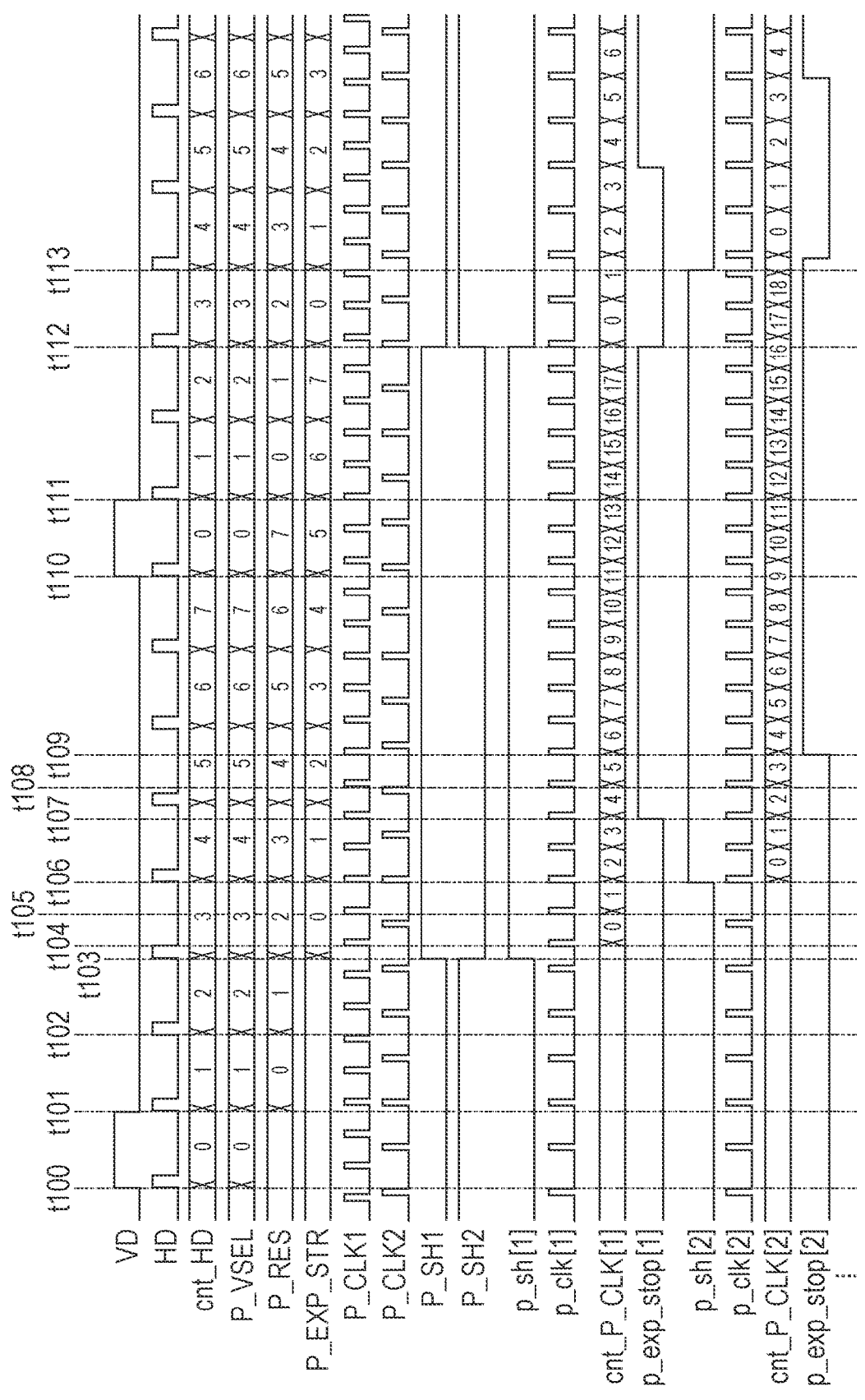
FIGS. 6A and 6B provide a timing diagram illustrating pixel drive operation.
Figure 6B:
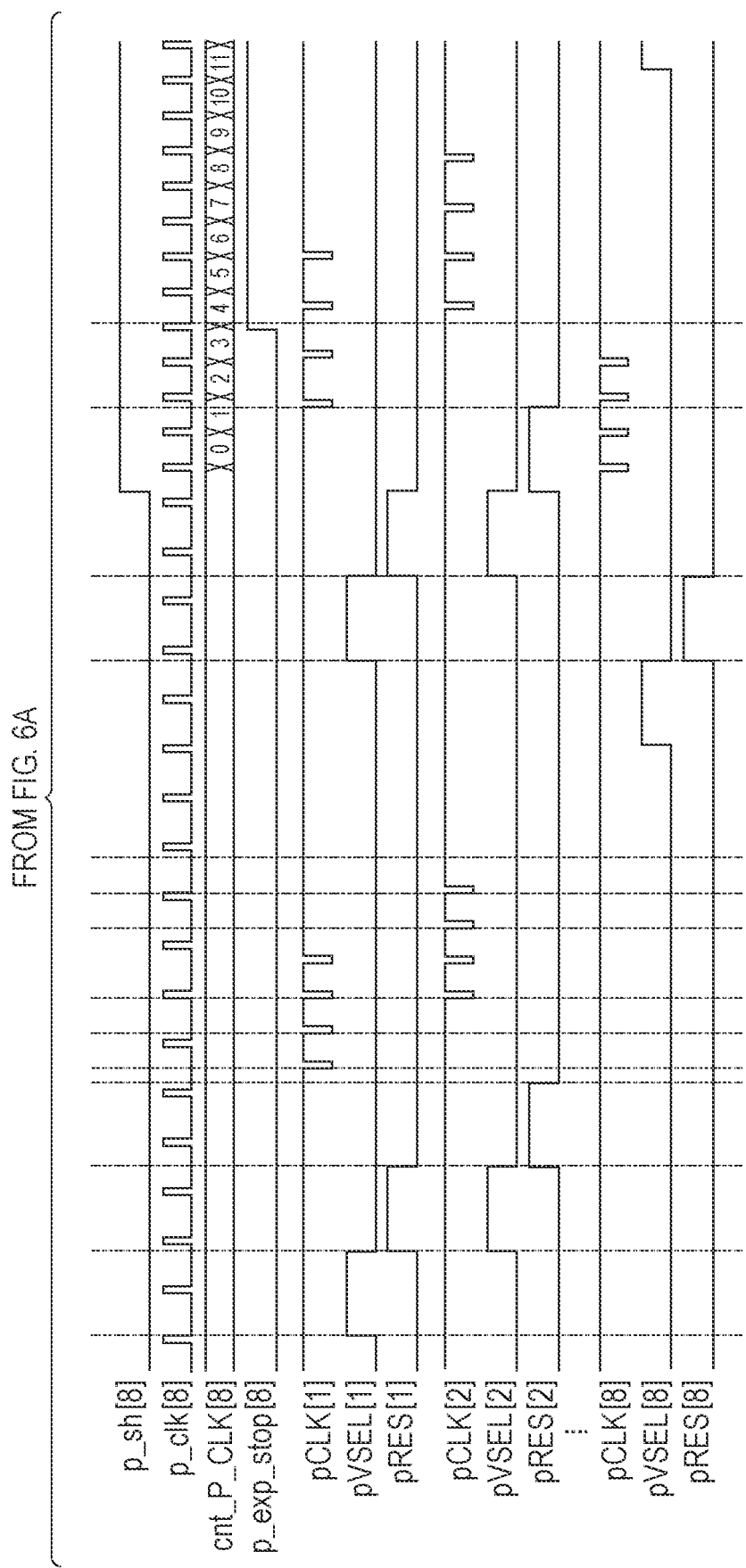

FIGS. 6A and 6B provide a timing diagram illustrating an example of operations of the vertical scanning control unit 22, the vertical scanner unit 30, and the pixel unit 10. The following describes the operations with reference to FIGS. 6A and 6B.

Input of Vertical Scanning Control Unit 22

Firstly, the CPU 70 runs a program, so that a signal for controlling the photoelectric conversion device 100 is fed to the control unit 20.

Accordingly, the synchronization signal generation unit 21 in the control unit 20 generates the vertical synchronization signal VD, the horizontal synchronization signal HD, and the clock MCLK. These signals are fed to the vertical scanning control unit 22, the signal processing control unit 23, and the horizontal scanning control unit 24.

cnt_HD

At a time t100, the vertical synchronization signal VD changes to the high level, and the count value cnt_HD is accordingly reset to 0.

At a time t101, the horizontal synchronization signal HD changes to the high level, and the count value cnt_HD increases to 1. The count value cnt_HD increases every time the horizontal synchronization signal HD changes to the high level.

cnt_P_CLK

At the time t100, the vertical synchronization signal VD changes to the high level, and the pulse counter unit 223 starts counting the signal P_CLK.

At the time t101, the signal P_CLK changes to the high level, and the count value cnt_P_CLK is reset to 0.

At a time t103, the signal P_CLK changes to the high level, and the count value cnt_P_CLK increases to 1. The count value cnt_P_CLK increases every time the signal P_CLK changes to the high level.

Reset Operation

At the time t101, based on the condition that cnt_HD=1, the signal P_RES changes to 0.

The value 0 is a predetermined set value; the set value may be controlled with, for example, a register. The timing when the signal P_RES changes to 0 is not necessarily when the count value cnt_HD is 1; the timing may be controlled with, for example, a register.

At a time t102, the horizontal synchronization signal HD changes to the high level, and the signal P_RES accordingly increases to 1. The increase is not necessarily made in increments of +1; the signal P_RES may increase to a particular value. These settings for increase may be controlled by using setting information stored in a register. In the following, the signal P_RES increases (by +1) every time the horizontal synchronization signal HD changes to the high level.

At the time t101, the value of the signal P_RES changes to 0, and the signal pRES[1] in response changes to the high level, thereby designating the first row of the pixel unit 10 as the target row of reset operation. The signal pRES[1] controls the counter 14 of the pixel P. When the signal pRES[1] is at the high level, the count value stored in the counter 14 is reset.

At a time t104, the value of the signal P_RES changes to 1, and the signal pRES[1] changes to the low level so that the first row of the pixel unit 10 is removed from the target row of reset operation.

cnt_P_CLK

At the time t103, the value of the signal P_EXP_STR changes to 0, and the pulse counter unit 355 starts counting the signal P_CLK.

At the time t104, the signal P_CLK changes to the high level, and the count value cnt_P_CLK is reset to 0.

At a time t105, the signal P_CLK changes to the high level, and the count value cnt_P_CLK increases to 1. The count value cnt_P_CLK increases every time the signal P_CLK changes to the high level.

Exposure Initiation Operation and Exposure Termination Operation

At the time t103, the value of the signal P_EXP_STR changes to 0; accordingly, the signal P_SH1 changes to the high level, and the signal P_SH2 changes to the low level. At a time t112, the value of the signal P_EXP_STR changes to 0; accordingly, the signal P_SH1 changes to the low level, and the signal P_SH2 changes to the high level. In the following, every time the value of the signal P_EXP_STR changes to 0, the signal P_SH1 and the signal P_SH2 toggle.

The timing when the signal P_SH1 and the signal P_SH2 toggle is not necessarily limited to when the signal P_EXP_STR changes to 0. The timing may be controlled with a set value stored in, for example, a register.

At the time t103, the value of the signal P_EXP_STR changes to 0, and the first row of the pixel unit 10 is designated as the target row of exposure initiation operation. As a result, feeding of the signal pCLK[1] starts. To generate the signal pCLK[1], the signal P_CLK is used.

At a time t107, based on the condition that cnt_p_clk[1]=4, a signal p_exp_stop[1] changes to the high level. The timing when the signal p_exp_stop[1] changes to the high level is not necessarily limited to when the count value cnt_p_clk[1] changes to 4. The timing may be controlled with another set value stored in, for example, a register.

At the time t107, the signal p_exp_stop[1] changes to the high level, and the first row of the pixel unit 10 is designated as the target row of exposure termination operation. As a result, feeding of the signal pCLK[1] ends.

The period from the time t104 to the time t107 is the exposure period of the first row of the pixel unit 10.

For the exposure period, the signal pCLK[1] controls the resistance of the quenching element 12 of the pixels P in the first row of the pixel unit 10, thereby controlling the voltage supplied to the APD 11. Because the quenching element 12 is a PMOS transistor, when the signal pCLK is at the high level, the quenching element 12 is in an off-state; when the signal pCLK is at the low level, the quenching element 12 is in an on-state.

At the time t103, the value of the signal P_EXP_STR changes to 0, and the first row of the pixel unit 10 is designated as the target row of exposure initiation operation. As a result, the vertical scanner unit 30 starts feeding the signal pCLK[1]. To generate the signal pCLK[1], the signal P_CLK is used. The signal pCLK[1] controls the quenching element 12 of the pixels P in the first row of the pixel unit 10, thereby controlling the voltage supplied to the APD 11. Because the quenching element 12 is a PMOS transistor, when the signal pCLK is at the high level, the quenching element 12 is in an off-state; when the signal pCLK is at the low level, the quenching element 12 is in an on-state.

At the time t107, based on the condition that cnt_p_clk[1]=4, the signal p_exp_stop[1] changes to the high level. The timing when the signal p_exp_stop[1] changes to the high level is not necessarily limited to when the count value cnt_p_clk[1] changes to 4. The timing may be controlled with another set value stored in, for example, a register.

At the time t107, the signal p_exp_stop[1] changes to the high level, and the first row of the pixel unit 10 is designated as the target row of exposure termination operation. As a result, the vertical scanner unit 30 ends feeding the signal pCLK[1].

The period from the time t104 to the time t107 is the exposure period of the first row of the pixel unit 10.

For the exposure period, the signal pCLK[1] controls an operational condition (the resistance) of the quenching element 12 of the pixels P in the first row of the pixel unit 10, thereby controlling the voltage supplied to the APD 11.

Behavior of Pixel Drive Signals

At the time t103, the value of the signal P_EXP_STR changes to 0. At this timing, the signal P_SH1 is at the high level, and the signal P_SH2 is at the low level.

Accordingly, the signal p_sh[1] changes to the high level.

At the time t112, the value of the signal P_EXP_STR changes to 0. At this timing, the signal P_SH1 is at the low level, and the signal P_SH2 is at the high level. Accordingly, the signal p_sh[1] changes to the low level.

The pulse signal selection unit 357 selects the signal P_CLK1 for the period from the time t103 to the time t112, for which the signal p_sh[1] indicates the high level. As a result, the signal P_CLK1 is outputted as the signal p_clk[1].

While the signal p_sh[1] indicates the low level, the pulse signal selection unit 357 selects the signal P_CLK2 and outputs the signal P_CLK2 as the signal p_clk[1].

At the time t103, the value of the signal P_EXP_STR changes to 0. Accordingly, the first row of the pixel unit 10 is designated as the target row of exposure initiation operation, and the vertical scanner unit 30 starts feeding the signal pCLK[1]. To generate the signal pCLK[1], the signal p_clk[1] is used.

At a time t106, the value of the signal P_EXP_STR changes to 1. At this timing, the signal P_SH1 is at the high level, and the signal P_SH2 is at the low level.

Accordingly, the signal p_sh[2] changes to the high level.

At a time t113, the value of the signal P_EXP_STR changes to 1. At this timing, the signal P_SH1 is at the low level, and the signal P_SH2 is at the high level.

At this time, the signal p_sh[2] changes to the low level.

The pulse signal selection unit 357 selects the signal P_CLK1 for the period from the time t106 to the time t113, for which the signal p_sh[2] indicates the high level. As a result, the signal P_CLK1 is outputted as the signal P_CLK[2].

While the signal p_sh[2] indicates the low level, the pulse signal selection unit 357 selects the signal P_CLK2 and outputs the signal P_CLK2 as the signal p_clk[2].

At the time t106, the value of the signal P_EXP_STR changes to 1, and the second row of the pixel unit 10 is designated as the target row of exposure initiation operation. As a result, feeding of the signal pCLK[2] starts. To generate the signal pCLK[2], the signal p_clk[2] is used.

Read Operation

At a time t110, based on the condition that cnt_HD=0, the signal P_VSEL changes to 0. The value 0 is a predetermined set value, but this is not to be interpreted as limiting. The value may be controlled with another set value stored in, for example, a register. The timing when the signal P_VSEL changes to 0 is not necessarily when the count value cnt_HD is 0. For example, based on setting information stored in a register, the timing when the signal P_VSEL changes may be set at the timing when the count value cnt_HD is a predetermined value.

At a time t111, the horizontal synchronization signal HD changes to the high level, and the signal P_VSEL accordingly increases to 1. The increase is not necessarily made in increments of +1; the signal P_RES may increase to a particular value. The value may be controlled with another set value stored in, for example, a register. In the following, the signal P_VSEL increases (by +1) every time the horizontal synchronization signal HD changes to the high level.

At the time t110, the value of the signal P_VSEL changes to 0, the signal pVSEL[1] changes to the high level. Accordingly, the first row of the pixel unit 10 is designated as the target row of read operation. The signal pVSEL[1] controls the pixel output circuit 15 of the pixels P. When the signal pVSEL[1] is at the high level, the counter 14 and the signal line pOUT are coupled to each other, and the count value is read.

At the time t111, the value of the signal P_VSEL changes to 1, and the signal pVSEL[1] changes to the low level so that the first row of the pixel unit 10 is removed from the target row of read operation.

Changes of Target Row for Operations

At the time t102, the value of the signal P_RES changes to 1, and the second row of the pixel unit 10 is designated as the target row of reset operation.

At the time t103, the value of the signal P_EXP_STR changes to 1, and the second row of the pixel unit 10 is designated as the target row of exposure initiation operation.

At a time t109, the value of a signal P_EXP_STOP changes to 1, and the second row of the pixel unit 10 is designated as the target row of exposure termination operation. As a result, the vertical scanner unit 30 ends feeding the signal pCLK[2].

At the time t111, the value of the signal P_VSEL changes to 1, and the second row of the pixel unit 10 is designated as the target row of read operation.

The operations performed on the second row of the pixel unit 10 are the same as the operations performed on the first row of the pixel unit 10.

In the present embodiment, the vertical scanning control unit 22 includes the pulse signal generation unit 221 for generating the signals P_CLK1 and P_CLK2 of different periods.

Unlike the case in which the signals P_CLK1 and P_CLK2 are generated as in the present embodiment, if it is assumed, for example, that the period of the signal MCLK is changed, the signal MCLK is used on all the pixel rows as a common signal. If the period of the signal MCLK is changed before the exposure periods of all the pixel rows end, the exposure periods of some pixel rows before exposure operation are changed. As a result, the image produced is based on different lengths of exposure period, and thus, the image includes luminance variations. For this reason, the period of the signal MCLK is changed after all the exposure periods of the pixel rows end.

By contrast, in the present embodiment, the signals P_CLK1 and P_CLK2 of different periods are generated as described above. With this configuration, before the exposure periods of all the pixel rows end, it is possible to change the length of exposure period of the pixel row having been subjected to signal reading.

Further, in the present embodiment, while performing scanning for reading signals from the pixels P in a plurality of rows, the selection unit can change selection of clock signal. This means that while reading signals from the pixels P in some rows, the selection units corresponding to the pixels P in some other rows can change selection of a clock signal from a plurality of clock signals. With this configuration, the length of exposure period can be changed during scanning for reading signals.

As described above, in the present embodiment, the length of exposure period can be changed in a desired manner.

In the present embodiment, the selection retention unit 356 is provided for each row of the pixels P, but this example is not to be interpreted as limiting. For example, a plurality of the row driver units 35 corresponding to two or more pixel rows may share one selection retention unit 356. In this case as well, the length of exposure period can be changed in units of the pixel rows sharing the selection retention unit 356.

In the present embodiment, the signals P_CLK1 and P_CLK2 are generated inside the photoelectric conversion device, but this example is not to be interpreted as limiting. For example, the signals P_CLK1 and P_CLK2 may be fed to the photoelectric conversion device from a generation circuit provided outside the photoelectric conversion device. In this case, an external input pad (an external connection terminal) for receiving the signal P_CLK1 and an external input pad (an external connection terminal) for receiving the signal P_CLK2 are provided in the photoelectric conversion device.

Figure 7A:
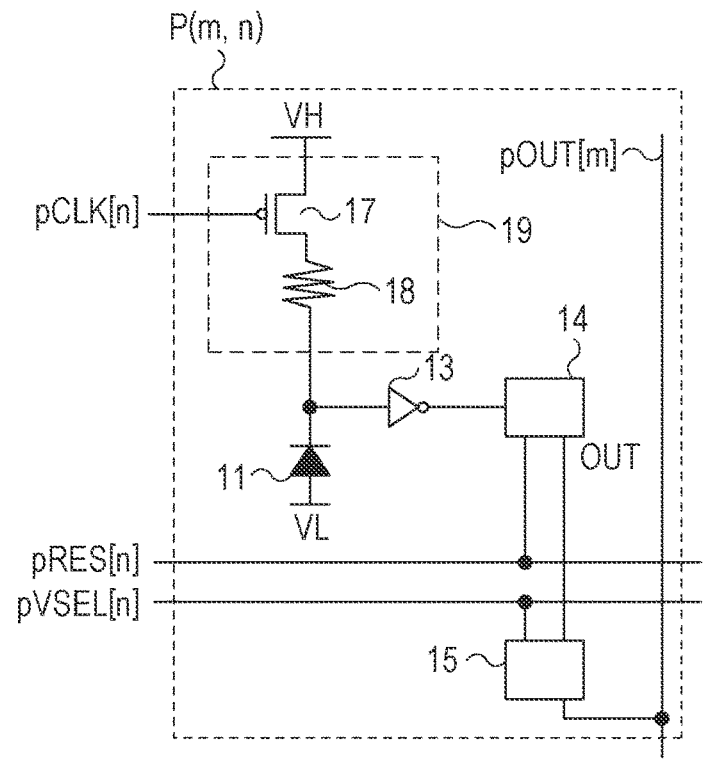
FIGS. 7A and 7B illustrate configurations of a pixel.

In the present embodiment, the quenching circuit 19 is implemented by the quenching element 12, but this is not to be interpreted as limiting. As illustrated in FIG. 7A, the quenching circuit 19 may include a switch 17 and a resistance element 18. In this case, the signal pCLK described in the present embodiment is inputted to the switch 17. The switch 17 is implemented by a PMOS transistor; this example is, however, not to be interpreted as limiting, and the switch 17 may be implemented by any element capable of functioning as a switch.

Figure 7B:
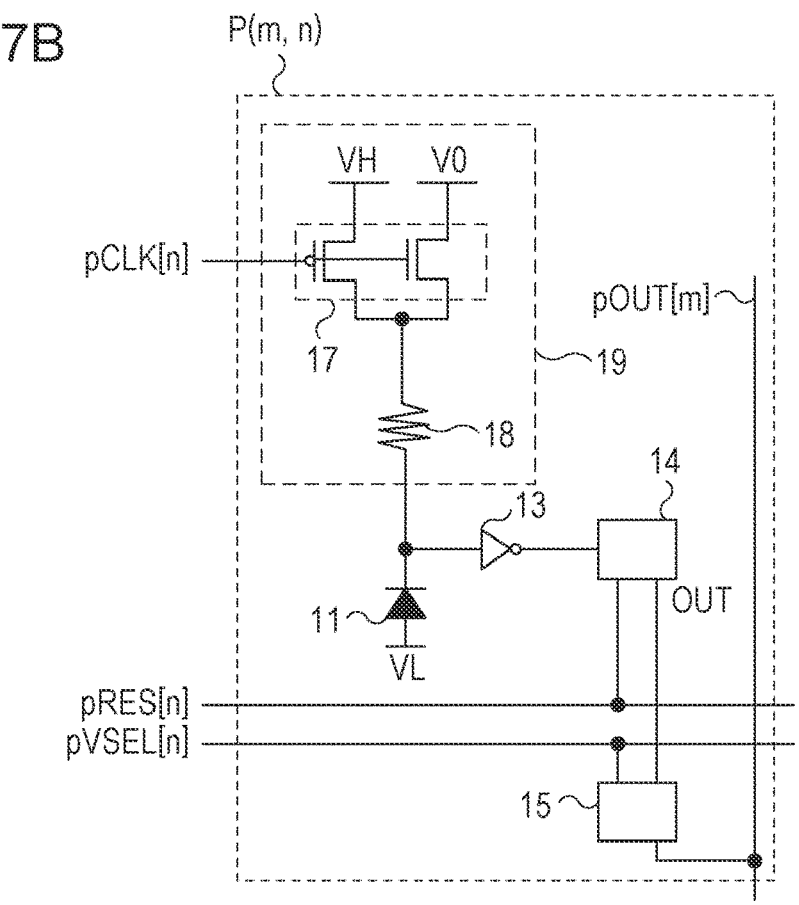

As illustrated in FIG. 7B, the switch 17 may include a plurality of transistors. In this case, the voltage VH is inputted to one of the transistors, a voltage V0 is inputted to the other of the transistors. The voltage V0 is closer to the voltage VL than to the voltage VH. When the voltage V0 is inputted to the APD 11, avalanche multiplication is not effected. While the voltage VH is inputted to the resistance element 18, quenching is effected in the APD 11. By contrast, while the voltage V0 is inputted to the resistance element 18, quenching is not effected in the APD 11. The signal pCLK is inputted to the gate of the plurality of transistors. In this configuration, the plurality of transistors having the gate receiving the signal pCLK vary with respect to the conductivity type. However, this example is not to be interpreted as limiting. For example, the signal pCLK may be inputted to the gate of one transistor, and a signal obtained by inverting the signal pCLK with an inverter circuit may be inputted to the gate of the other transistor.

Second Embodiment

The following describes a photoelectric conversion device according to a second embodiment of the present disclosure with reference to FIGS. 8 to 11, mainly explaining points different from the first embodiment. In the present embodiment, the configurations of the pixel P, the vertical scanning control unit 22, and the vertical scanner unit 30 differ from the first embodiment.

Pixel P(m, n)

Figure 8:
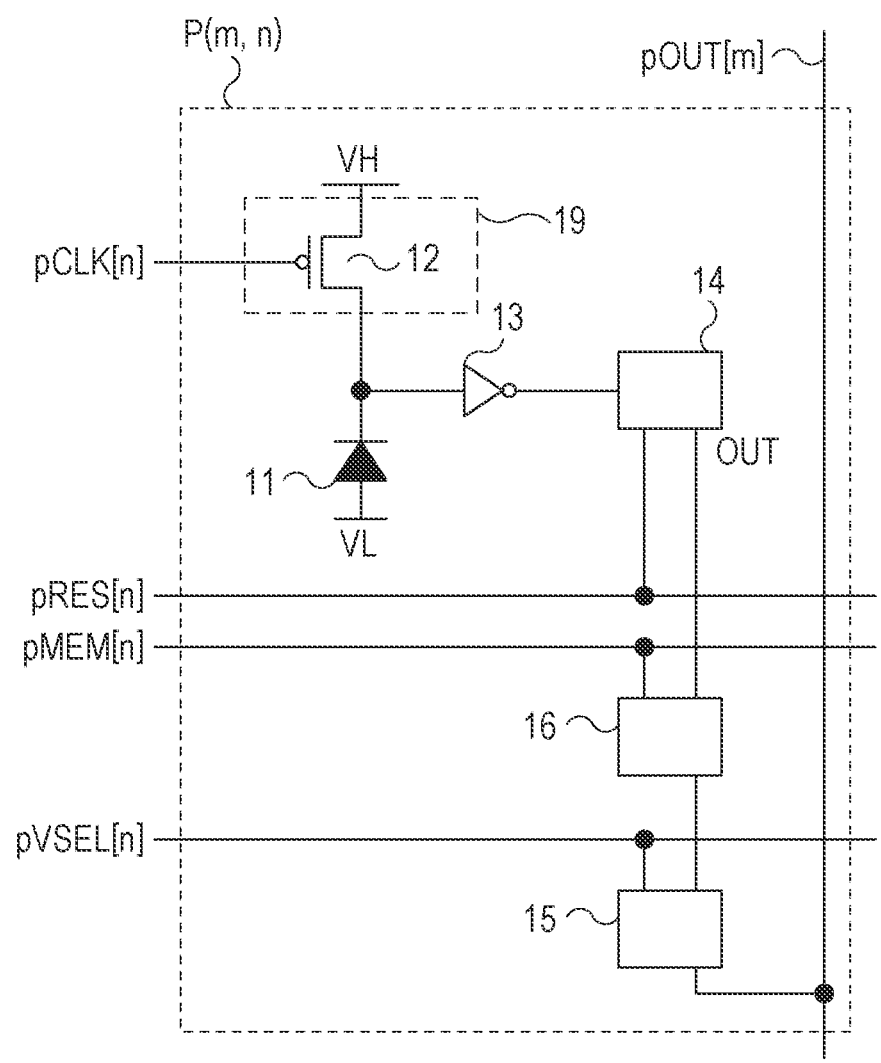
FIG. 8 illustrates a configuration of a pixel.

FIG. 8 illustrates a configuration of the pixel P(m, n) according to the second embodiment.

In the present embodiment, the pixel P(m, n) includes a memory unit 16. The vertical scanner unit 30 feeds a signal pMEM[n] to the memory unit 16 through a drive line. Based on this signal pMEM, the operation of the memory unit 16 switches between an operation of updating a signal value stored in the memory unit 16 to a signal value outputted by the counter 14 and an operation of retaining the signal value. The output value of the memory unit 16 is inputted to the pixel output circuit 15.

Vertical Scanning Control Unit 22

Figure 9:
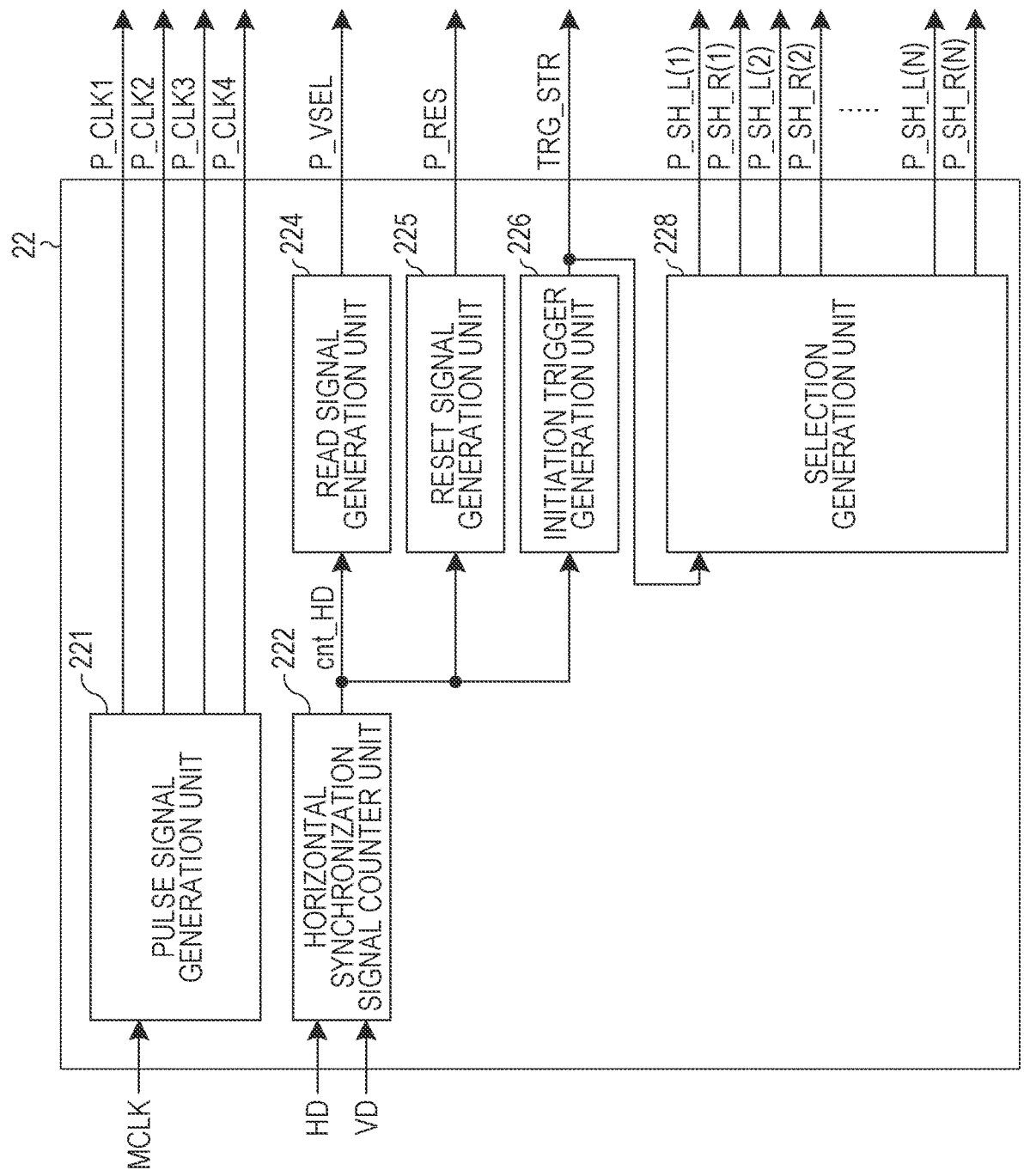
FIG. 9 illustrates a configuration of a vertical scanning control unit.

FIG. 9 illustrates a configuration of the vertical scanning control unit 22 according to the second embodiment.

In the present embodiment, the initiation trigger generation unit 226 generates a signal TRG_STR as an exposure initiation trigger signal and outputs the signal TRG_STR to the vertical scanner unit 30. The signal TRG_STR is a trigger signal indicating initiation of exposure and can be used as a signal common to all the pixel rows of the pixel unit 10. The CPU 70 may generate the signal TRG_STR. The pulse signal generation unit 221 in the vertical scanning control unit 22 generates the signal P_CLK1, the signal P_CLK2, a signal P_CLK3, and a signal P_CLK4. The period of these signals can be controlled in units of one cycle of the signal MCLK. The period of the individual signals can be made different from each other.

The selection generation unit 228 generates a number 2N of pulse signal selection information signals P_SH_L(1) to (N), and P_SH_R(1) to (N) in accordance with the timing of the signal TRG_STR. The last characters "L" and "R" of the pulse signal selection information signals respectively correspond to a first region and a second region that are formed by dividing the pixel unit 10 into two in the horizontal direction. The first region is a left region from the first column to the M/2th column. The second region is a right region from the (M/2)+1th column to the Mth column. The number of divided regions is not necessarily two and may be three of more. In this case, the pulse signal selection information signals can be increased as appropriate.

The pulse signal generation unit 221 may output signals P_CLK_L[1] to [N], and P_CLK_R[1] to [N] corresponding to the respective pixel regions. In this case, the selection generation unit 228, the signal P_SH_L, the signal P_SH_R, and the signals P_CLK1 to 4 can be removed. In this case, the signal TRG_STR is inputted to the pulse signal generation unit 221. In accordance with the timing of the signal TRG_STR, the period of the pulse signals is changed. In this case, the signals P_CLK_L[1] to [N], and P_CLK_R[1] to [N], which are the pulse signals, can be controlled in the same manner as pulse signals p_clk_L[1] to [N], and p_clk_R[1] to [N] in FIG. 10 described later.

Vertical Scanner Unit 30

Figure 10:
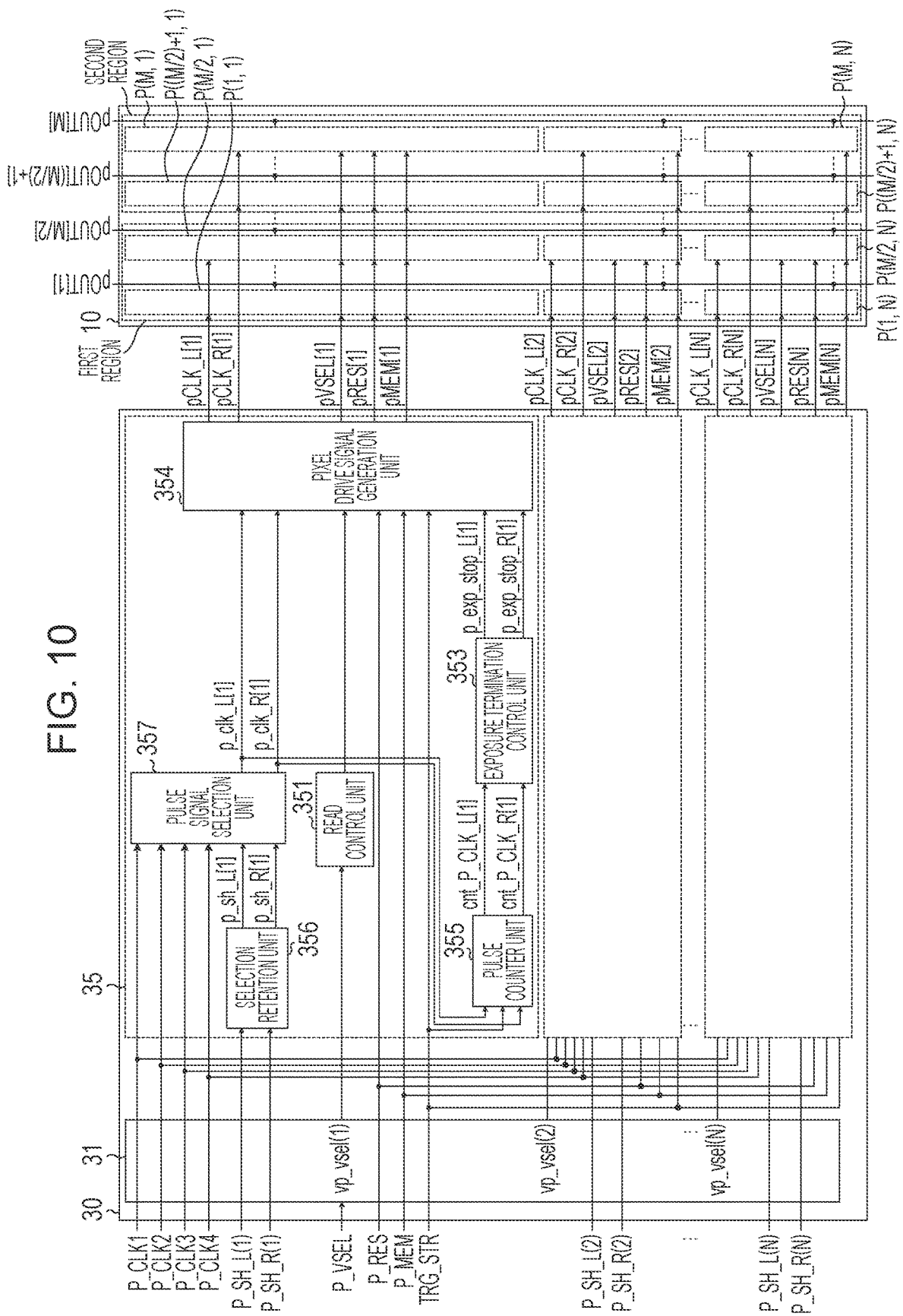
FIG. 10 illustrates a configuration of a vertical scanner unit.

FIG. 10 illustrates a configuration of the vertical scanner unit 30 according to the second embodiment. In the present embodiment, the vertical scanner unit 30 does not include the second decoder unit 32, the third decoder unit 33, and the exposure initiation control unit 352. Instead of the signal P_CLK, the signal P_CLK1, the signal P_CLK2, the signal P_CLK3, and the signal P_CLK4 are inputted to the vertical scanner unit 30 and inputted to the row driver units 35 of all the rows in a common manner. The configuration may be changed as appropriate such that the number of the signals P_CLK is five or more. Instead of the signal P_SH1 and the signal P_SH2, corresponding signals of the signals P_SH_L (1) to (N), and P_SH_R(1) to (N) are inputted to the selection retention unit 356. The signal P_EXP_STR is inputted to the pulse counter unit 355 instead of the selection retention unit 356.

A signal P_MEM and the signal P_RES are inputted to the pixel drive signal generation units 354 of all the rows in a common manner.

The pixel unit 10 is divided in the horizontal direction into the first region (the left region from the first column to the M/2th column) and the second region (the right region from the (M/2)+1th column to the Mth column). The signal pCLK_L and the signal pCLK_R are respectively fed to the first region and the second region. The number of the regions may be three or more. In this case, the signal pCLK is increased as appropriate.

Also in the present embodiment, the pulse signal selection unit 357 is a selection unit for selecting a clock signal to be outputted from a plurality of inputted clock signals of different periods.

Behavior of Pixel Drive Signals

Figure 11B:
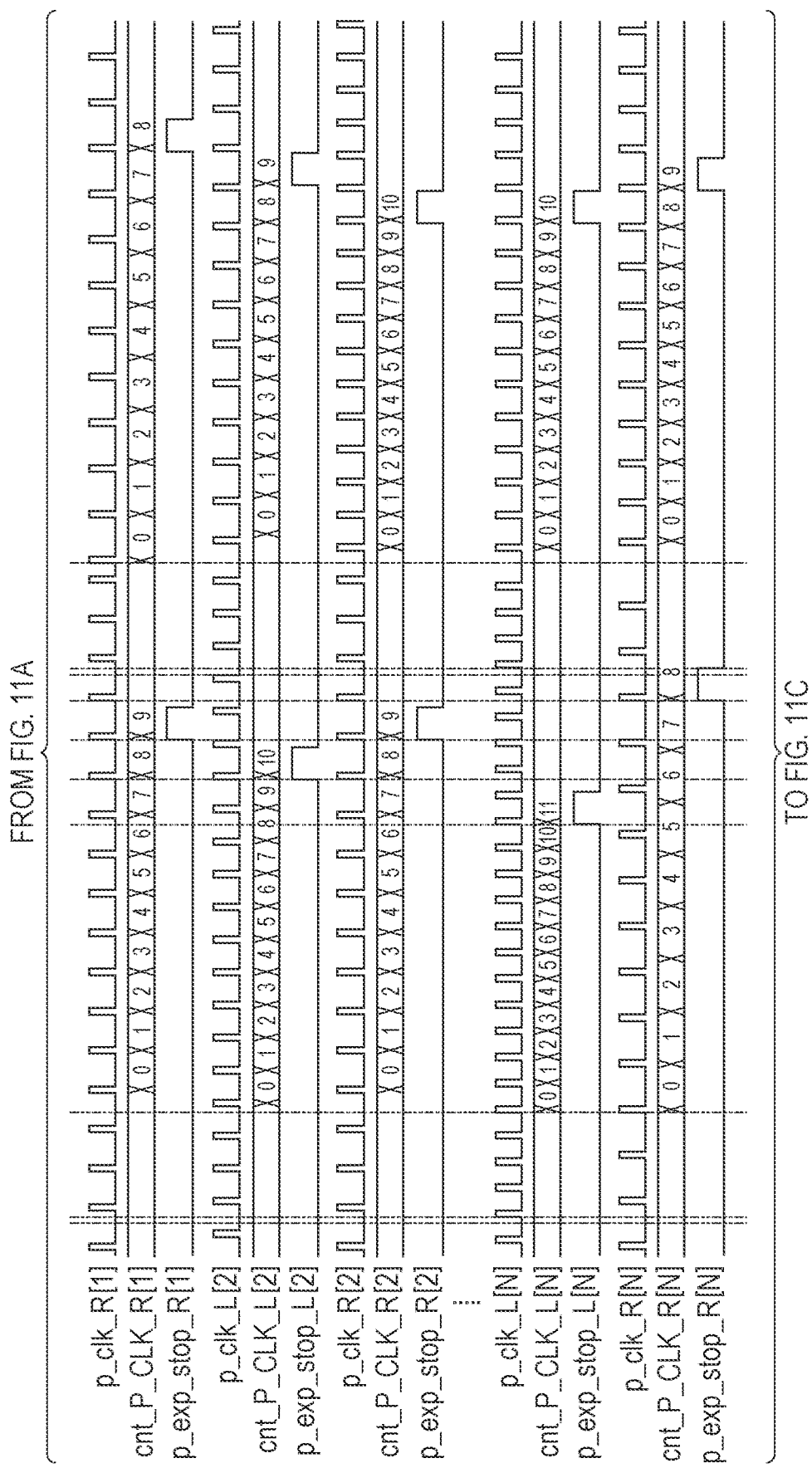
Figure 11C:
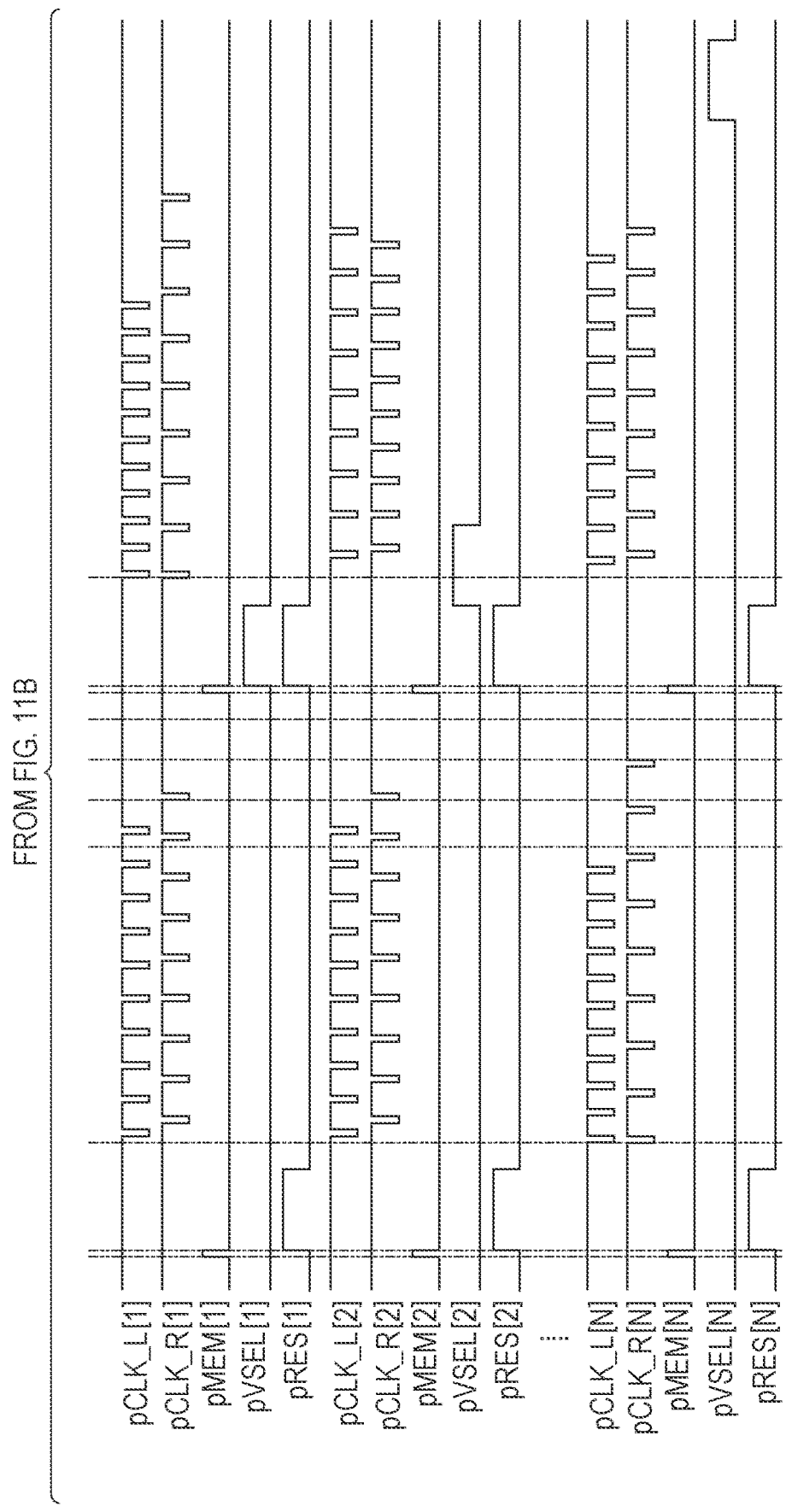

FIGS. 11A, 11B, and 11C provide a timing diagram illustrating an example of operations of the vertical scanning control unit 22, the vertical scanner unit 30, and the pixel unit 10, according to the second embodiment. The following describes the operations with reference to FIGS. 11A, 11B, and 11C.

At the time t100, the vertical synchronization signal VD changes to the high level. In response to this change, the signal P_MEM changes to the high level. As a result, the signal pMEM for the pixel rows changes to the high level simultaneously on all the pixel rows.

At the time t101, the signal P_MEM changes to the low level, and the signal pMEM also changes to the low level. The signal P_RES changes to the high level, and accordingly, the signal pRES changes to the high level simultaneously on the individual pixel rows.

At the time t102, the signal TRG_STR changes to the high level, and feeding of the signal pCLK_L and the signal pCLK_R to the rows starts. Additionally, the level of the signals P_SH_L(1), P_SH_R(1) to P_SH_L(N), and P_SH_R(N) change. In this example, P_SH_L(1) changes to 0, P_SH_R(1) to 1, P_SH_L(2) to 0, P_SH_R(2) to 1, P_SH_L(N) to 2, and P_SH_R(N) to 3. The values may be different values. Here, the pulse signal selection unit 357 is configured to: select P_CLK1 when the pulse signal selection information signal indicates 0; select P_CLK2 when the pulse signal selection information signal indicates 1; select P_CLK3 when the pulse signal selection information signal indicates 2; select P_CLK4 when the pulse signal selection information signal indicates 3. These selections may be changed by different assignments.

At the time t102, the signal TRG_STR changes to the high level, and the pulse counter unit 355 starts counting the signal p_clk_L and the signal p_clk_R.

At the time t103, the count value cnt_P_CLK_L[N] changes to 11, and the signal p_exp_stop_L[N] changes to the high level. The timing when the signal p_exp_stop_L[N] changes to the high level is not necessarily limited to when the count value cnt_P_CLK_L[N] changes to 11. The timing may be controlled with another set value stored in, for example, a register.

At the time t103, the signal p_exp_stop_L[N] changes to the high level, and feeding of the signal pCLK_L[N] corresponding to the first column to the M/2th column in the Nth row of the pixel unit 10 ends.

At the time t104, the count values cnt_P_CLK_L[1] and cnt_P_CLK_L[2] change to 10, and the signals p_exp_stop_L[1] and p_exp_stop_L[2] change to the high level. The timing when the signals p_exp_stop_L[1] and p_exp_stop_L[2] change to the high level is not necessarily limited to when the count values cnt_P_CLK_L[1] and cnt_P_CLK_L[2] change to 10. The timing may be controlled with another set value stored in, for example, a register.

At the time t104, the signals p_exp_stop_L[1] and p_exp_stop_L[2] change to the high level. Accordingly, feeding of the signals pCLK_L[1] and pCLK_L[2] corresponding to the first column to the M/2th column in the first row and the second row of the pixel unit 10 ends.

At the time t105, the count values cnt_P_CLK_R[1] and cnt_P_CLK_R[2] change to 9. In response to this, the signal p_exp_stop_R[1] and p_exp_stop_R[2] change to the high level. The timing when the signals p_exp_stop_R[1] and p_exp_stop_R[2] change to the high level is not necessarily limited to when the count values cnt_P_CLK_R[1] and cnt_P_CLK_R[2] change to 9. The timing may be controlled with another set value stored in, for example, a register.

At the time t105, the signals p_exp_stop_R[1] and p_exp_stop_R[2] change to the high level. Accordingly, feeding of the signals pCLK_R[1] and pCLK_R[2] corresponding to the (M/2)+1th column to the Mth column in the first row and the second row of the pixel unit 10 ends.

At the time t106, the count value cnt_P_CLK_R[N] changes to 8, and the signal p_exp_stop_R[N] changes to the high level. The timing when the signal p_exp_stop_R[N] changes to the high level is not necessarily limited to when the count value cnt_P_CLK_R[N] changes to 8. The timing may be controlled with another set value stored in, for example, a register.

At the time t106, the signal p_exp_stop_R[N] changes to the high level, and feeding of the signal pCLK_R[N] corresponding to the (M/2)+1th column to the Mth column in the Nth row of the pixel unit 10 ends.

By selecting settings of the period of the signal pCLK fed to the pixel P and the exposure period on the individual pixel regions, the exposure time in each region controlled by the corresponding signal pCLK can be individually controlled in units of one cycle of the signal P_CLK.

At the time t107, p_MEM changes to the high level, and accordingly, the signal pMEM changes to the high level simultaneously on the individual pixel rows. As a result, the memory unit 16 stores the count values of the individual pixels, relating to the exposure initiated at the time t102.

At a time t108, the signal P_MEM changes to the low level. Accordingly, the signal pMEM changes to the low level. The signal P_RES changes to the high level, and accordingly, the signal pRES changes to the high level simultaneously on the individual pixel rows. As a result, the count values of the individual pixels relating to the exposure initiated at the time t102 are reset. Additionally, p_VSEL changes to 0, and pVSEL[1] accordingly changes to the high level. As a result, the count values stored in the pixels in the first row are read. In the following, in accordance with the value of p_VSEL, the count values are read consecutively from the rows.

At the time t109, the signal TRG_STR changes to the high level, and the pulse counter unit 355 starts counting the signal p_clk_L and the signal p_clk_R. The value of the signal P_SH_L and the value of the signal P_SH_R may be changed from the values at the time t102. In this case, the length of the exposure period starting at the time t109 differs from the length of the exposure period starting at the time t102.

The present embodiment can implement a pixel drive method in which the timing of initiating exposure and the timing of terminating exposure are the same among all rows, that is, the global shutter method. The selection unit selects a clock signal for each pixel region from a plurality of clock signals of different periods. As a result, the exposure period can be changed on each pixel region while achieving the effect of the first embodiment. When imaging target regions differ from each other with respect to brightness, this configuration enables image capturing with the exposure period of a length suitable for the individual regions.

Third Embodiment

Figure 12:
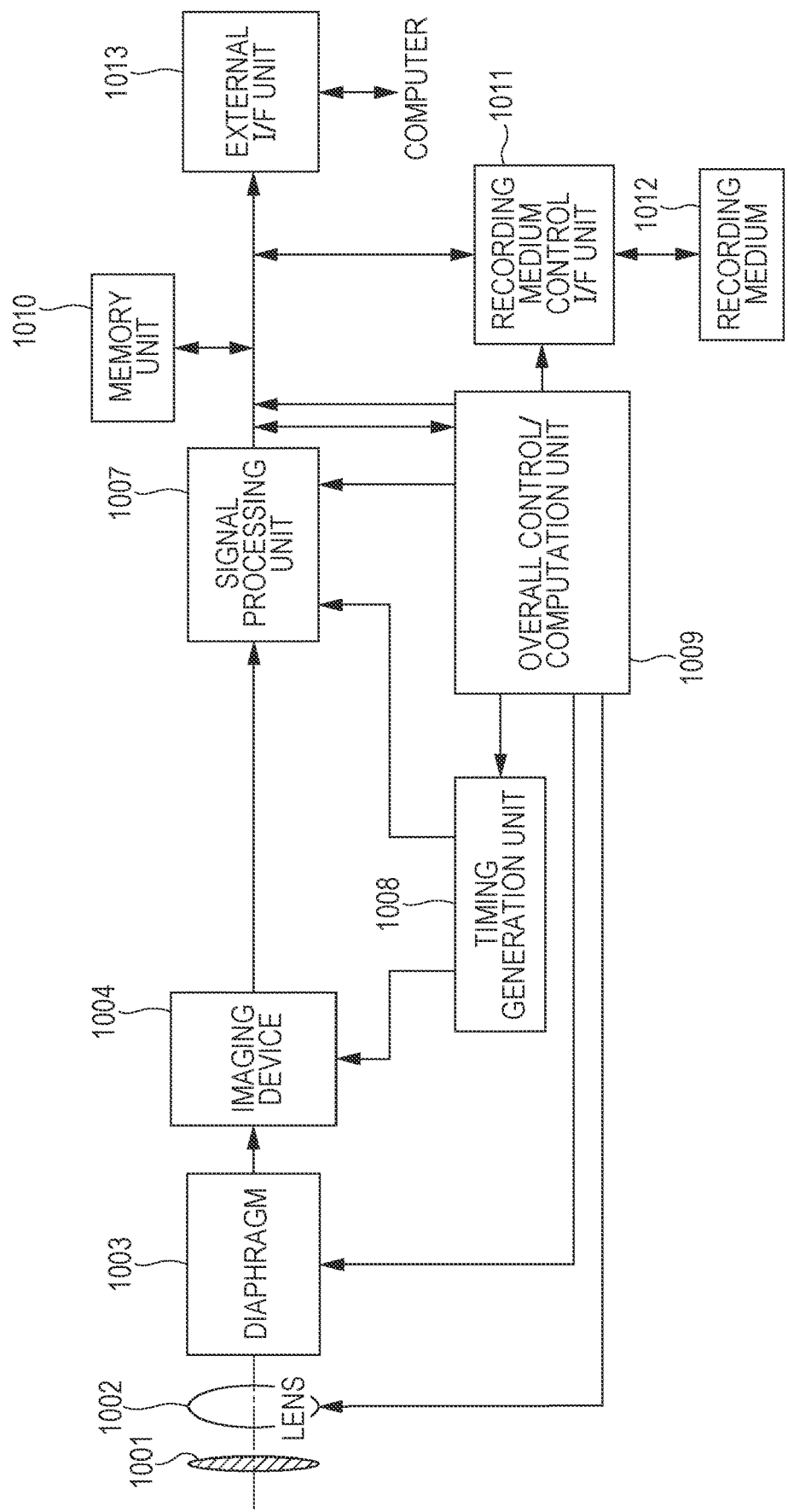
FIG. 12 illustrates a configuration of a photoelectric conversion system.

A photoelectric conversion system according to the present embodiment will be described with reference to FIG. 12. FIG. 12 is a block diagram illustrating the outline of a configuration of a photoelectric conversion system according to the present embodiment.

The imaging devices described in the first and second embodiments can be used in various photoelectric conversion systems. Examples of the photoelectric conversion systems include a digital still camera, a digital camcorder, a monitoring camera, a copier, a fax machine, a mobile phone, an in-vehicle camera, and an observatory satellite. Examples of the photoelectric conversion systems also include a camera module having an optical system such as a lens and an imaging device. Of these examples, FIG. 12 provides a block diagram of a digital still camera as an example.

The photoelectric conversion system illustrated in FIG. 12 includes an imaging device 1004, a lens 1002 for forming an optical image of an object on the imaging device 1004, a diaphragm 1003 for changing the amount of light passing through the lens 1002, and a barrier 1001 for protecting the lens 1002. The lens 1002 and the diaphragm 1003 together form an optical system for collecting light onto the imaging device 1004. The imaging device 1004 is a photoelectric conversion device (an imaging device) of the embodiments described above, and the imaging device 1004 converts the optical image formed by the lens 1002 into an electrical signal.

The photoelectric conversion system includes a signal processing unit 1007 that is an image generation unit for generating an image by processing the output signal from the imaging device 1004. The signal processing unit 1007 performs various kinds of correction and compression as necessary and outputs image data. The signal processing unit 1007 may formed at a semiconductor substrate having the imaging device 1004 or at another semiconductor substrate different from the imaging device 1004. The imaging device 1004 and the signal processing unit 1007 may be formed at the same semiconductor substrate.

The photoelectric conversion system further includes a memory unit 1010 for temporarily storing image data and an external interface unit (external I/F unit) 1013 for communicating with an external computer and other devices. The photoelectric conversion system further includes a recording medium 1012, such as a semiconductor memory, for recording or reading imaging data and a recording medium control interface unit (recording medium control I/F unit) 1011 for performing recording or reading on the recording medium 1012. The recording medium 1012 may be provided in the photoelectric conversion system in a built-in manner or a detachable manner.

The photoelectric conversion system further includes an overall control/computation unit 1009 for performing various kinds of computation and controlling the entire digital still camera and a timing generation unit 1008 for outputting various timing signals to the imaging device 1004 and the signal processing unit 1007. The timing signals and the like may be inputted from the outside; the photoelectric conversion system includes at least the imaging device 1004 and the signal processing unit 1007 for processing output signals outputted by the imaging device 1004.

The imaging device 1004 outputs an imaging signal to the signal processing unit 1007. The signal processing unit 1007 performs a predetermined kind of signal processing on the imaging signal outputted by the imaging device 1004 and outputs image data. By using the imaging signal, the signal processing unit 1007 generates an image.

As described above, the present embodiment can implement a photoelectric conversion system using a photoelectric conversion device (an imaging device) of the embodiments described above.

Fourth Embodiment

Figure 13A:
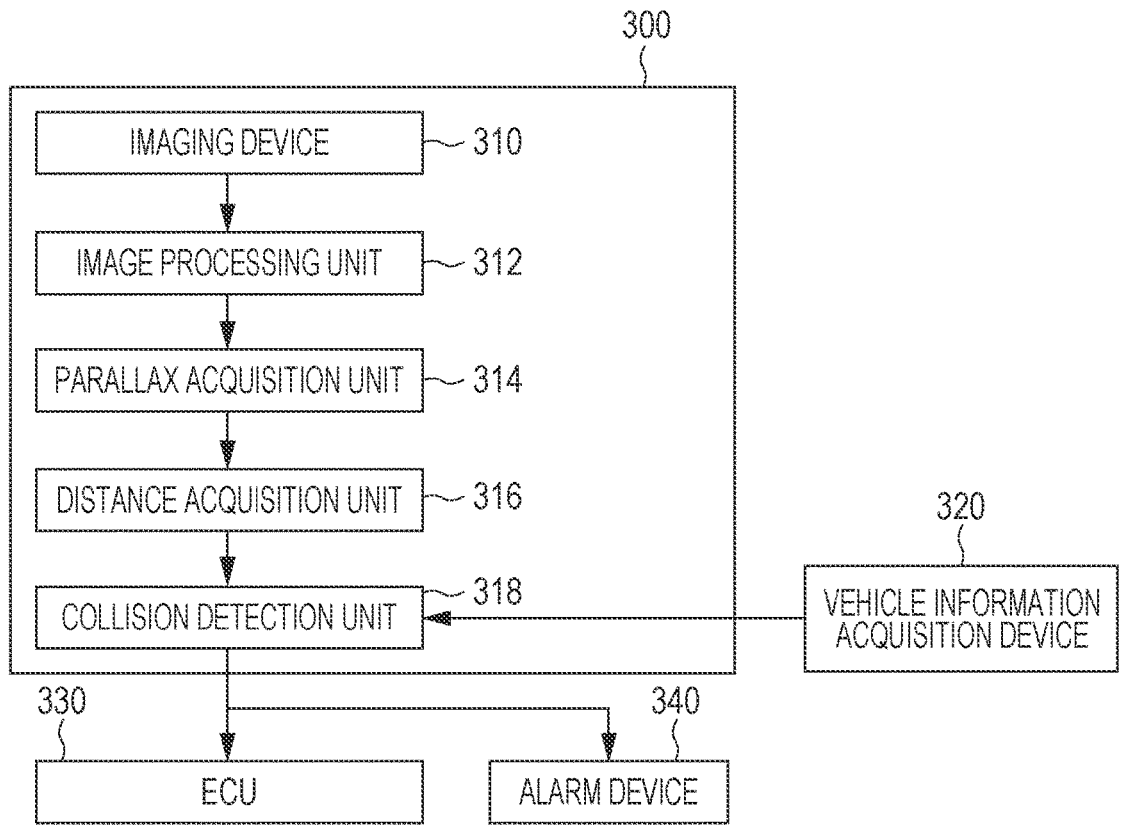
FIGS. 13A and 13B illustrate a configuration and operation of a mobile object.

A photoelectric conversion system and a mobile object according to the present embodiment will be described with reference to FIG. 13. FIGS. 13A and 13A illustrate a configuration of a photoelectric conversion system and a configuration of a mobile object, according to the present embodiment.

FIG. 13A illustrates an example of a photoelectric conversion system relating to an in-vehicle camera. A photoelectric conversion system 300 includes an imaging device 310. The imaging device 310 is a photoelectric conversion device (an imaging device) of any of the embodiments described above. The photoelectric conversion system 300 includes an image processing unit 312 for performing image processing on a plurality of pieces of image data obtained by the imaging device 310 and a parallax acquisition unit 314 for calculating parallax differences (phase differences between parallax images) on the plurality of pieces of image data obtained by the photoelectric conversion system 300. The photoelectric conversion system 300 further includes a distance acquisition unit 316 for calculating the distance to a target object based on the calculated parallax differences and a collision detection unit 318 for determining collision probability based on the calculated distance. The parallax acquisition unit 314 and the distance acquisition unit 316 are an example of a distance information acquisition unit for acquiring distance information of the distance to a target object. The distance information is information about, for example, parallax differences, defocus level, and distance to a target object. The collision detection unit 318 may determine collision probability by using any of these kinds of distance information. The distance information acquisition unit may be implemented by a hardware device designed for dedicated use or a software module. Alternatively, the distance information acquisition unit may be implemented by, for example, a field-programmable gate array (FPGA) or an application-specific integrated circuit (ASIC), or a combination thereof.

The photoelectric conversion system 300 is connected to a vehicle information acquisition device 320 and can acquire vehicle information including, for example, vehicle speed, yaw rate, and steering angle. The photoelectric conversion system 300 is also connected to an electronic control unit (ECU) 330 that is a control device for outputting a control signal to apply braking force to the vehicle in accordance with the determination result obtained by the collision detection unit 318. The photoelectric conversion system 300 is also connected to an alarm device 340 for providing warning for the driver in accordance with the determination result obtained by the collision detection unit 318. For example, when the collision probability obtained as the determination result by the collision detection unit 318 is high, the ECU 330 provides vehicle control by, for example, braking, releasing the accelerator, or reducing output power from the engine to avoid collision and lessen damage. The alarm device 340 provides warning for the user by, for example, raising an alarm such as sound, displaying warning information on the screen of a system such as an automotive navigation system, or vibrating the sheet belt or the steering wheel.

Figure 13B:
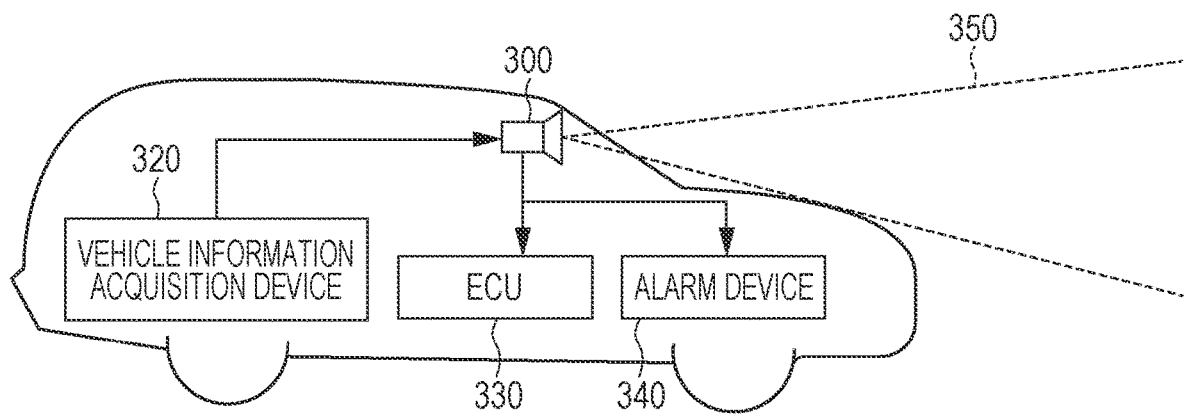

In the present embodiment, the photoelectric conversion system 300 captures an image of an area around the vehicle such as the front or rear area. FIG. 13B illustrates the photoelectric conversion system capturing an image of a front area (an imaging area 350) ahead of the vehicle. The vehicle information acquisition device 320 provides an instruction for the photoelectric conversion system 300 or the imaging device 310. This configuration can improve the accuracy of distance measurement.

The above has described the example of control to avoid collision with other vehicles, but the present embodiment is applicable to, for example, automated driving control to follow other vehicle or not to drive off the lane. Moreover, the photoelectric conversion system is not necessarily used on a vehicle such as a car; the photoelectric conversion system may be used on a mobile object (a mobile machine) such as a ship or airplane, or an industrial robot. Additionally, the photoelectric conversion system may be used in, as well as the mobile object, a wide variety of systems using object recognition technologies, such as an intelligent transportation system (ITS).

MODIFIED EMBODIMENTS

The present disclosure is not limited to the embodiments described above, and various modifications to the present disclosure can be made.

For example, embodiments of the present disclosure include an example in which a constituent element of any of the embodiments is added to another of the embodiments and an example in which a constituent element of any of the embodiments is replaced with a constituent element of another of the embodiments.

Furthermore, the photoelectric conversion systems described in the third and fourth embodiments are merely examples of a photoelectric conversion system using the photoelectric conversion device. The configuration of the photoelectric conversion system using the photoelectric conversion device of the present disclosure is not limited to the configurations illustrated in FIGS. 12 and 13.

The embodiments described above are merely specific examples realizing the present disclosure, and these embodiments should not be interpreted as limiting the scope of the disclosure. This means that the present disclosure may be implemented in various forms without departing from technical ideas or main features of the present disclosure.

Fifth Embodiment

Figure 14:
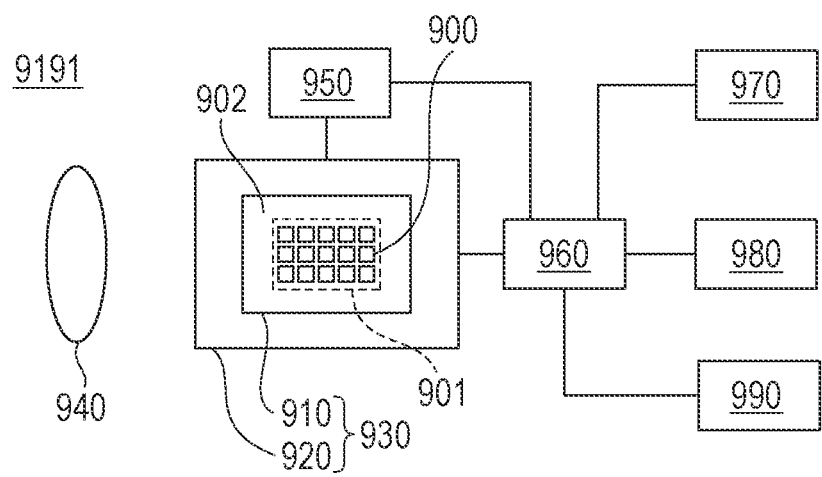
FIG. 14 illustrates a configuration regarding an apparatus.

The present embodiment may be applied to either of the first and second embodiments. FIG. 14 schematically illustrates an apparatus 9191 including a photoelectric conversion device 930 according to the present embodiment. The photoelectric conversion device 930 is any one or any combination of the photoelectric conversion devices described in the first and second embodiments. The following describes in detail the apparatus 9191 including the photoelectric conversion device 930. The photoelectric conversion device 930 may include, as well as a semiconductor device 910 having a semiconductor layer 10 as described above, a package 920 housing the semiconductor device 910. The package 920 may include a base having the semiconductor device 910, and a lid made of a material such as glass, facing the semiconductor device 910. The package 920 may include joint members, such as bonding wires and bumps, for coupling terminals provided at the base and terminals provided at the semiconductor device 910.

The apparatus 9191 may include at least any of an optical device 940, a control device 950, a processing device 960, a display device 970, a storage device 980, and a mechanical device 990. The optical device 940 corresponds to the photoelectric conversion device 930. The optical device 940 may be, for example, a lens, a shutter, and a mirror. The control device 950 controls the photoelectric conversion device 930. The control device 950 is a photoelectric conversion device implemented by, for example, an ASIC.

The processing device 960 processes signals outputted by the photoelectric conversion device 930. The processing device 960 is a photoelectric conversion device for forming an analog front-end (AFE) or digital front-end (DFE), implemented by, for example, a CPU or ASIC. The display device 970 is an electroluminescent (EL) display device or liquid crystal display device for displaying information (images) obtained by the photoelectric conversion device 930. The storage device 980 is a magnetic device or semiconductor device for storing information (images) obtained by the photoelectric conversion device 930. The storage device 980 is a volatile memory such as a static random-access memory (SRAM) or dynamic random-access memory (DRAM), or a non-volatile memory such as a flash memory or hard disk drive.

The mechanical device 990 includes a drive unit or propelling unit such as a motor or engine. The apparatus 9191 displays a representation of signals outputted by the photoelectric conversion device 930 on the display device 970 or outputs the signals to the outside by using a communication device (not illustrated in the drawing) included in the apparatus 9191. For these purposes, in one embodiment, the apparatus 9191 further includes the storage device 980 and the processing device 960 in addition to a storage circuit and an arithmetic circuit that are included in the photoelectric conversion device 930. The mechanical device 990 may be controlled based on a signal outputted by the photoelectric conversion device 930.

The apparatus 9191 may be usable as an electronic device such as an information terminal having an image capturing function (for example, a smartphone or wearable terminal) or a camera (for example, an interchangeable lens camera, compact camera, video camera, or monitoring camera). The mechanical device 990 in a camera can drive components of the optical device 940 for zooming, focusing, or operating the shutter. The mechanical device 990 in a camera may move the photoelectric conversion device 930 for vibration control.

The apparatus 9191 may be usable as a transport apparatus such as a vehicle, ship, or aircraft. The mechanical device 990 in a transport apparatus may be usable as a mobile machine. The apparatus 9191 as a transport apparatus is suitable to move the photoelectric conversion device 930 or to provide assistance and/or automation of driving (controlling) with the use of the image capturing function. The processing device 960 for providing assistance and/or automation of driving (controlling) can perform processing for operating the mechanical device 990 as a mobile machine based on information obtained by the photoelectric conversion device 930. Alternatively, the apparatus 9191 may be usable as a medical tool such as an endoscope, a measurement tool such as a distance measurement sensor, an analyzer such as an electron microscope, an office machine such as a copier, or an industrial machine such as a robot.

In the embodiments described above, favorable pixel characteristics can be achieved. Thus, the value of the photoelectric conversion device can be increased. Here, increasing the value means at least any of functionality improvement, performance improvement, characteristic improvement, reliability improvement, manufacturing yield enhancement, environmental load reduction, cost reduction, size reduction, and weight reduction.

As a result, the use of the photoelectric conversion device 930 according to the present embodiment in the apparatus 9191 also increases the value of the apparatus. For example, by installing the photoelectric conversion device 930 in a transport apparatus, high performance can be achieved when capturing images outside the transport apparatus or measuring the external environment. For this reason, regarding manufacturing and sales of a transport apparatus, if a decision is made to install the photoelectric conversion device according to the present embodiment in the transport apparatus, this is advantageous to enhancement of performance of the transport apparatus. The photoelectric conversion device 930 is particularly suitable for a transport apparatus in which driving assistance and/or automated driving is provided by using information obtained by the photoelectric conversion device.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-171693 filed Oct. 20, 2021, which is hereby incorporated by reference herein in its entirety.

What is claimed is:

1. A device comprising:
a pixel unit having a plurality of pixels arranged in a plurality of rows, each pixel including a quenching circuit configured to receive a signal for determining start and end of an exposure period and a photodiode coupled to the quenching circuit;
a selection unit configured to simultaneously receive a plurality of clock signals of different periods and select a clock signal to be outputted from the plurality of clock signals; and
a first generation unit configured to generate the signal by using the outputted clock signal.

2. The device according to claim 1 further comprising:
a second generation unit configured to simultaneously generate the plurality of clock signals by using a reference clock signal.

3. The device according to claim 1, further comprising:
a plurality of pads configured to simultaneously receive the plurality of clock signals from the outside of the device.

4. The device according to claim 1, wherein
a period of the selected clock signal corresponding to a pixel in a portion of a collection of the plurality of rows of the plurality of pixels is different from a period of the selected clock signal corresponding to a pixel in another portion of the collection of the plurality of rows of the plurality of pixels.

5. The device according to claim 1, wherein
the selection unit is configured to select the clock signal in response to a trigger signal for controlling start of the exposure period.

6. The device according to claim 1, wherein
a length of the exposure period is controlled by using the selected clock signal.

7. The device according to claim 1, further comprising:
a counter unit configured to generate a count value by counting the selected clock signal; and
a control unit configured to control end of the exposure period based on the count value.

8. The device according to claim 7, wherein
the plurality of pixels each include a transistor having a gate,
the device further comprising a third generation unit configured to feed a control signal to the gate, wherein
the control unit is configured to output a signal for controlling end of the exposure period to the third generation unit.

9. The device according to claim 8, further comprising:
a scanner unit configured to scan the plurality of rows in units of one row, or two or more rows, the scanner unit including a plurality of row driver units each corresponding to a portion of a collection of the plurality of rows, wherein
the plurality of row driver units each including the third generation unit and the control unit.

10. The device according to claim 9, wherein
the plurality of row driver units each include the counter unit.

11. The device according to claim 1, wherein
during the exposure period of a pixel in a portion of a collection of the plurality of rows of the plurality of pixels,
the selection unit corresponding to a pixel in another portion of the collection of the plurality of rows of the plurality of pixels changes the clock signal to be outputted to another clock signal out of the plurality of clock signals.

12. The device according to claim 1, wherein
while a signal is read from a pixel in a portion of a collection of the plurality of rows of the plurality of pixels,
the selection unit corresponding to a pixel in another portion of the collection of the plurality of rows of the plurality of pixels changes the clock signal to be outputted to another clock signal out of the plurality of clock signals.

13. The device according to claim 1, wherein
the exposure period starts simultaneously on the plurality of rows.

14. The device according to claim 13, wherein
the exposure period ends simultaneously on the plurality of rows.

15. The device according to claim 1, wherein
the quenching circuit includes a quenching element implemented by a transistor having a gate for receiving the signal.

16. The device according to claim 1, wherein
the quenching circuit includes a switch configured to be controlled with the signal and a resistance element coupled to the switch.

17. A system comprising:
the device according to claim 1; and
a processing unit configured to generate an image by using a signal outputted by the device.

18. A mobile object comprising:
the device according to claim 1; and
a control unit configured to control movement of the mobile object by using a signal outputted by the device.

19. An apparatus comprising:
the device according to claim 1; and
at least any of
- an optical device corresponding to the device,
- a control device configured to control the device,
- a processing device configured to process a signal outputted by the device,
- a display device configured to display information obtained by the device,
- a storage device configured to store the information obtained by the device, and
- a mechanical device configured to operate in accordance with the information obtained by the device.

* * * * *